(12) United States Patent
Guynn et al.

(10) Patent No.: US 8,377,201 B2
(45) Date of Patent: Feb. 19, 2013

(54) NARROW PSD HYDRAULIC CEMENT, CEMENT-SCM BLENDS, AND METHODS FOR MAKING SAME

(75) Inventors: John M. Guynn, Salt Lake City, UT (US); Andrew S. Hansen, Bountiful, UT (US)

(73) Assignee: Roman Cement, LLC, Bountiful, UT (US)

( * ) Notice: Subject to any disclaimer, the term of this patent is extended or adjusted under 35 U.S.C. 154(b) by 0 days.

(21) Appl. No.: 13/315,089

(22) Filed: Dec. 8, 2011

(65) Prior Publication Data

US 2012/0085263 A1 Apr. 12, 2012

Related U.S. Application Data

(63) Continuation of application No. 13/183,205, filed on Jul. 14, 2011.

(60) Provisional application No. 61/365,064, filed on Jul. 16, 2010, provisional application No. 61/413,966, filed on Nov. 15, 2010, provisional application No. 61/450,596, filed on Mar. 8, 2011.

(51) Int. Cl.
| | |
|---|---|
| C04B 7/00 | (2006.01) |
| C04B 14/00 | (2006.01) |
| C04B 24/00 | (2006.01) |
| C04B 24/10 | (2006.01) |
| C04B 14/40 | (2006.01) |
| C04B 7/32 | (2006.01) |
| C04B 7/36 | (2006.01) |
| C04B 9/11 | (2006.01) |
| C04B 11/28 | (2006.01) |
| C04B 28/06 | (2006.01) |
| C04B 18/06 | (2006.01) |
| C04B 9/12 | (2006.01) |
| C04B 28/00 | (2006.01) |
| C04B 28/04 | (2006.01) |
| C04B 7/14 | (2006.01) |
| C04B 7/19 | (2006.01) |
| C04B 11/00 | (2006.01) |
| C04B 28/14 | (2006.01) |

(52) U.S. Cl. ........ 106/816; 106/695; 106/692; 106/624; 106/714; 106/709; 106/713; 106/737; 106/738; 106/789; 106/801

(58) Field of Classification Search .................. 106/695, 106/713, 709, 692, 624, 714, 816, 737, 738, 106/801, 789

See application file for complete search history.

(56) References Cited

U.S. PATENT DOCUMENTS

| | | |
|---|---|---|
| 4,160,674 A | 7/1979 | Sawyer |
| 4,509,985 A | 4/1985 | Davidovits et al. |

(Continued)

FOREIGN PATENT DOCUMENTS

| | | |
|---|---|---|
| CA | 2085219 | 10/2004 |
| EP | 0088587 | 9/1983 |

(Continued)

OTHER PUBLICATIONS

"Improved Cement Quality and Grinding Efficiency by Means of Closed Mill Circuit Modeling," A Dissertation by Gleb Gennadievich Mejeoumov, Submitted to the Office of Graduate Studies of Texas A&M University in partial fulfillment of the requirements for the degree of Doctor of Philosophy, Dec. 2007.

(Continued)

*Primary Examiner* — Anthony J Green
*Assistant Examiner* — Karam Hijji
(74) *Attorney, Agent, or Firm* — Workman Nydegger

(57) ABSTRACT

Hydraulic cements, such as Portland cements and other cements that include substantial quantities of tricalcium silicate ($C_3S$), dicalcium silicate ($C_2S$), tricalcium aluminate ($C_3A$), and/or tetracalcalcium alumino-ferrite ($C_4AF$), are particle size optimized to have increased reactivity compared to cements of similar chemistry and/or decreased water demand compared to cements of similar fineness. Increasing hydraulic cement reactivity increases early strength development and release of reactive calcium hydroxide, both of which enhance SCM replacement and 1-28 day strengths compared to blends of conventional Portland cement and one or more SCMs, such as coal ash, slag or natural pozzolan. Decreasing the water demand can improve strength by decreasing the water-to-cement ratio for a given workability. The narrow PSD cements are well suited for making blended cements, including binary, ternary and quaternary blends.

20 Claims, 12 Drawing Sheets

U.S. PATENT DOCUMENTS

| | | | |
|---|---|---|---|
| 4,640,715 | A | 2/1987 | Heitzmann et al. |
| 4,642,137 | A | 2/1987 | Heitzmann et al. |
| 4,842,649 | A | 6/1989 | Heitzmann et al. |
| 4,997,484 | A | 3/1991 | Gravitt et al. |
| 5,375,776 | A | 12/1994 | Kupper et al. |
| 5,417,760 | A | 5/1995 | Folsberg |
| 5,525,155 | A | 6/1996 | Allen |
| 5,531,823 | A | 7/1996 | Breton |
| 5,650,004 | A | 7/1997 | Yon |
| 5,651,505 | A | 7/1997 | Lidstrom |
| 5,718,759 | A | 2/1998 | Stav et al. |
| 5,804,175 | A | 9/1998 | Ronin et al. |
| 5,951,279 | A | 9/1999 | Hunold et al. |
| 6,027,561 | A | 2/2000 | Gruber et al. |
| 6,030,447 | A | 2/2000 | Naji et al. |
| 6,444,026 | B1 | 9/2002 | Steffler et al. |
| 6,641,658 | B1 | 11/2003 | Dubey |
| 6,691,628 | B2 | 2/2004 | Meyer et al. |
| 6,695,911 | B2 | 2/2004 | Ramesohl et al. |
| 7,240,867 | B2 | 7/2007 | Ronin |
| 7,296,994 | B2 | 11/2007 | Meyer et al. |
| 7,347,896 | B2 | 3/2008 | Harrison |
| 7,419,544 | B2 | 9/2008 | Naji et al. |
| 7,442,248 | B2 | 10/2008 | Timmons |
| 7,445,668 | B2 | 11/2008 | Sommain |
| 7,799,128 | B2 | 9/2010 | Guynn et al. |
| 7,972,432 | B2 | 7/2011 | Guynn et al. |
| 2001/0013302 | A1 | 8/2001 | Mathur et al. |
| 2001/0020654 | A1 | 9/2001 | Strasser et al. |
| 2003/0056935 | A1 | 3/2003 | Meyer et al. |
| 2004/0089203 | A1 | 5/2004 | Ronin |
| 2005/0000393 | A1 | 1/2005 | Virtanen |
| 2005/0204962 | A1 | 9/2005 | Luke et al. |
| 2007/0095255 | A1 | 5/2007 | Abbate et al. |
| 2007/0266906 | A1* | 11/2007 | Garcia ............................ 106/817 |
| 2009/0020044 | A1 | 1/2009 | Constantz et al. |
| 2009/0121052 | A1 | 5/2009 | Ronin et al. |
| 2009/0305019 | A1 | 12/2009 | Chanvillard et al. |
| 2010/0043673 | A1 | 2/2010 | Batoz et al. |
| 2010/0294171 | A1 | 11/2010 | Schwartzentruber et al. |
| 2010/0326326 | A1 | 12/2010 | Rigaud et al. |
| 2012/0024198 | A1 | 2/2012 | Schwartzentruber et al. |
| 2012/0037045 | A1 | 2/2012 | Fonollosa et al. |

FOREIGN PATENT DOCUMENTS

| | | |
|---|---|---|
| EP | 0263723 | 4/1988 |
| EP | 0611081 | 8/1994 |
| JP | 2002/068806 | 3/2002 |
| KR | 10-0183536 | 5/1999 |
| WO | WO 01/23317 | 4/2001 |

OTHER PUBLICATIONS

"The Cement Sustainability Initiative—Climate Actions", World Business Council for Sustainable Development ("WBCSD"), Nov. 2008.

Durán-Herrera et al., "Synergetic effect of a Polycarboxylate Superplasticizer and a Fly Ash in the Production of a Concrete with conventional water/binder ratios"; Ninth ACI International Conference on Superplasticizers and Other Chemical Admixture Program, American Concrete Institute, Oct. 12, 2009.

Bentz, D., "Calorimetric Studies of Powder Additions to Mitigate Excessive Retardation in High Volume Fly Ash Mixtures", ACI Materials Journal pp. 1-20, Sep. 9, 2009.

Yilmaz, A., "Relationship Between Compressive and Chemical Compositions of Portland and Pozzolanic Cements", BAÜ Fen Bil. Enst. Dergisi, 5.2, pp. 4-13, 2003.

"Engineering news, opinion and product reports for engineers in process, design, electronics, energy and chemical engineering", Particle Size Analysis Reduces Cement Manufacturing Costs—Engineer Live, for Engine . . . http://www.engineerlive.com/Process-Engineer/Materials_Handling/Particle_size_analysis . . . , pp. 1-7, Oct. 25, 2009.

"Florida Rock slashes production costs using advanced process control and real-time particle size analysis", Real-time Particle Size Analysis—Forums, http://www.bulk-online.com/Forum/showthread.php?threadid=18052, (At least as early as Oct. 25, 2009).

Uzal et al., "High Volume Natural Pozzolan Concrete for Structural Applications", Business Publications, ACI Materials Journal, Sep./Oct. 2007.

Mehta, K., "High-Performance, High-Volume Fly Ash Concrete for Sustainable Development," Proceedings of the International Workshop on Sustainable Development & Concrete Technology, pp. 3-14; May 2004.

Thomas et al., "Use of ternary cementitious systems containing silica fume and fly ash concrete," Elsevier Science Ltd. Sep. 21, 1999.

"Cement Substitutes, By-Products from other manufacturing or electric generating processes can be substituted for cement", Toolbase Services, NAHB Research Center (At least as early as Jul. 14, 2009).

Bentz, D., "Replacement of "coarse" cement particles by inert fillers in low w/c ratio concretes II. Experimental validation", Cement and Concrete Research 35, pp. 185-188, Sep. 3, 2004.

Bentz, D., "Computer modeling of the replacement of 'coarse' cement particles by inert fillers in low w/c ratio concretes Hydration and strength", Cement and Concrete Research 31, pp. 503-506, Jan. 5, 2001.

Bentz et al., "Effects of cement particle size distribution on performance properties of Portland cement-based materials", Cement and Concrete Research 29, pp. 1663-1671, Jul. 14, 1999.

"Understanding Cement, Cement science made easier, Variability of cement", http://www.understanding-cement.com/variability.html, Jan. 10, 2009.

"Roman Concrete", Wikipedia, http://en.wikipedia.org/wiki/Roman_cement, Jan. 10, 2009.

Moore, D. "The Riddle of Ancient Roman Concrete", www.romanconcrete.com/docs/spillway/'spillway.htm., Feb. 1993.

"Cement", Wikipedia, http://en.wikipedia.org/wiki/Hydraulic_cement, Sep. 5, 2008.

Middendorf et al., "Lime Pozzolan Binders: An Alternative to OPC?*", International Building Lime Symposium 2005, Orlando, Florida, pp. 1-13, Mar. 9-11, 2005.

Pure Natural Pozzolan Cement, Azmar International, Inc., pp. 1-11 (at least as early as Jul. 2008).

"Fly ash", Wikipedia, http://en.wikipedia.org/wiki/Fly_ash, Jan. 10, 2009.

"Cement Types," Ceratech, www.ceratechinc.com/cement.asp, Sep. 5, 2008.

"Pozzolan," Wikipedia, http://en.wikipedia.org/wiki/Pozzolan, Jan. 10, 2009.

"Pozzolete, a natural resource," Natural Pozzolan of Nevada, http://www.naturalpozzolan.com/pozzolete/index.html, Dec. 17, 2008.

"About Pozzolans, Pozzolans General Description," Vitro Minerals, http://www.vitrominerals.com/printablec%20pages/tech-infor.htm, Dec. 17, 2008.

"CT-Microcem Ultra Fine Cement", Finland CT (at least as early as Jan. 2009).

Barger, GS, "Production and Use of Calcined Natural Pozzolans in Concrete," Journal of Cement, Concrete and Aggregates, vol. 23, Issue 2, Dec. 2001.

"Fly Ash," U.S. Department of Transportation, Infrastructure Materials Group, http://fhwa.dot.gov/infrastructure/materialsgrp/flyash.htm, Jan. 10, 2009.

Gibbons, P., Pozzolans for Lime Mortars, The Building Conservation Directory 1997, http://www.buildingconvservation.com/articles/lime/pozzo.htm, pp. 1-5, Sep. 5, 2008.

Osbaeck, B. and Johansen, V., "Particle Size Distribution and Rate of Strength Development of Portland Cement," J. Am. Ceram. Soc., 72 (2) pp. 197-201, Feb. 1989.

Horst, Scot, "Some Basics About Substituting Pozzolans for Portland Cement in Concrete," as taken from presentation handout with author's permission, USGBC Member Summit, Tucson, AZ, pp. 1-7, Aug. 2001.

"Blender dedusts fly ash with minimal moisture to cut transport costs," Case History, Powder and Bulk Engineering, www.powderbulk.com, Jul. 2001.

Shah, Surendra P. and Wang, Kejin, "Development of "Green" Cement For Sustainable Concrete Using Cement Kiln Dust and Fly Ash," Dept. of Civil Engineering, Northwestern University, Evanston, IL USA and Dept. of Civil Engineering Iowa State University, Ames IA USA, pp. 15-23 (at least as early as Feb. 2009).

Technical Evaluation of Energetically Modified Cement, ISG Resources Inc., pp. 1-4, Aug. 2001.

Bentz, Dale, "Considerations of Designing High Volume Fly Ash Mixtures," ACI 2009 Spring Convention, Research in Progress, Powerpoint Presentation, pp. 1-5, presented Mar. 16, 2009.

Malvern, "Inform-Reducing the Cost of Cement Production Benefits to Vulcan Materials Decision to Upgrade its Finishing Circuit from Manual to Automated Process Monitoring and Control," World Cement, Jul. 2009.

Basalite Concrete Products, "Microcem-Microfine Cement," (at least as early as Jun. 2006).

Andersen, P., "Control and Monitoring of Concrete Production..a Study of Particle Packing and Rheology", The Danish Academy of Technical Sciences, 1990.

Durán-Herrera et al., "Evaluation of Sustainable High-Volume Fly-Ash Concretes", National Institute of Standards and Technology, (2009).

Bentz, D., "Limestone Fillers Conserve Cement, Part 1: An analysis based on Powders' model", Concrete International, pp. 41-46, Nov. 2009.

Bentz et al., "Mixture Proportioning Options for Improving High Volume Fly Ash Concretes", at least as early as Feb. 19, 2010 at http://concrete.nist.gov/bentz.

International Search Report and Opinion dated May 6, 2010 from PCT Application Serial No. PCT/US2009/060194.

International Preliminary Report on Patentability dated Apr. 12, 2011 from PCT Application Serial No. PCT/US2009/060194.

Cross et al., "Evaluation of the Durability of 100 Percent Fly Ash Concrete," Western Transportation Institute, Final Report Nov. 2006 through Jun. 2008, 45 pages.

Hwang et al. "Rheological behavior of a slag cement paste prepared by adjusting the particle size distribution", Journal of Ceramic Processing Research, vol. 10, No. 4, pp. 409-413, (2009).

Zhang et al., "A new gap-graded particle size distribution and resulting consequences on properties of blended cement," Cement & Concrete Composites 33 (2011) 543-550 (Available online Mar. 1, 2011).

OK Vertical Roller Mill, Product brochure published by FLSmidth (2010).

Wang et al., The Application and Development of Fly Ash in China, 2007 World of Coal Ash (WOCA), May 7-10, 2007, Northern Kentucky, USA.

Harbour et al., Characterization of Slag, Fly Ash and Portland Cement for Saltstone (Feb. 2006).

Gurney et al., Using Limestone to Reduce Set Retardation in High Volume Fly Ash Mixtures: Improving Constructability for Sustainability, National Institute of Standards and Technology (Submission Date: Aug. 1, 2011).

Van Oss, Background Facts and Issues Concerning Cement and Cement Data, USGS (2005).

De Weerdt et al., Synergy between fly ash and limestone powder in ternary cements, Cement & Concrete Composites (Accepted Sep. 7, 2010).

Sato et al., Effect of nano-$CaCO_3$ on hydration of cement containing supplementary cementitious materials, Advances in Cement Research, 23, (1), pp. 1-29, Oct. 2010.

De Weerdt et al., Hydration mechanisms of ternary Portland cements containing limestone powder and fly ash, Cement & Concrete Research (Accepted Nov. 19, 2010).

Zhang et al., "Study on optimization of hydration process of blended cement," J. Therm. Anal. Calorim. DOI 10.1007/s10973-011-1531-8 (Published online: Apr. 8, 2011).

Vogt, Carsten, "Ultrafine particles in concrete: Influence of ultrafine particles on concrete properties and application to concrete mix design," Doctoral Thesis, School of Architecture and the Build Environment, Division of Concrete Structures, Royal Institute of Technology, Sweden, TRITA-BKN. Bullentin 103, 2010.

Fennis, et al., "The use of particle packing models to design ecological concrete," HERON vol. 54, No. 2/3 (2009).

Bentz et al., "Optimization of Particle Sizes in High Volume Fly Ash Blended Cements," NISTIR (Feb. 2011).

D. Bentz, A. Hansen, J. Guynn, "Optimization of cement and fly ash particle sizes to produce sustainable concretes," Cement & Concrete Composites 33 (2011) 824-831 (Available online May 7, 2011).

Bentz, et al., "Influence of Particle Size Distributions on Yield Stress and Viscosity of Cement-Fly Ash Pastes," (Accepted for Publication in Cement & Concrete Composites Nov. 2011).

U.S. Appl. No. 12/576,117, filed Oct. 8, 2009, Notice of Allowance dated Jul. 22, 2010.

U.S. Appl. No. 12/848,945, filed Aug. 2, 2010, Office Action mailed Oct. 15, 2010.

U.S. Appl. No. 12/848,945, filed Aug. 2, 2010, Office Action mailed Dec. 28, 2010.

U.S. Appl. No. 12/848,945, filed Aug. 2, 2010, Notice of Allowance dated Mar. 3, 2011.

* cited by examiner

NARROW PSD HYDRAULIC CEMENT, CEMENT-SCM BLENDS, AND METHODS FOR MAKING SAME

CROSS REFERENCE TO RELATED APPLICATION

This application is a continuation of U.S. application Ser. No. 13/183,205, filed Jul. 14, 2011, which claims the benefit of the following: U.S. Provisional Application No. 61/365,064, filed Jul. 16, 2010, U.S. Provisional Application No. 61/413,966, filed Nov. 15, 2010, and U.S. Provisional Application No. 61/450,596, filed Mar. 8, 2011. The disclosures of the foregoing applications are incorporated herein in their entirety.

BACKGROUND OF THE INVENTION

1. Field of the Invention

The invention is generally in the field of hydraulic cements used in the manufacture of concrete, such as Portland-type cements.

2. Relevant Technology

In modern concrete, Supplementary Cementing Materials (SCMs), such as fly ash, slag, natural pozzolans, and limestone, are sometimes used to replace a portion of Portland cement. SCMs can yield improved concrete with higher durability, lower chloride permeability, reduced creep, increased resistance to chemical attack, lower cost, and reduced environmental impact. Fly ash and other pozzolans react with excess calcium hydroxide released during hydration of Portland cement but can retard strength development.

Portland cement is the most expensive component of concrete and contributes an estimated 5-7% of all manmade $CO_2$. There is a long-felt, but unmet need to reduce Portland cement consumption. There are academic conferences dedicated to the concept of replacing Portland cement with SCMs. Despite an oversupply of low cost SCMs, the industry has failed to overcome technical hurdles to more effectively utilizing such materials. The failure, after decades of research and discussion, to fully utilize readily available and less expensive waste SCMs to reduce Portland cement consumption, even though doing so would reduce cost and benefit the environment, means that conventional practices for utilizing SCMs are inadequate. Hundreds of millions of tons of excess waste SCMs such as fly ash continue to be discarded into the environment worldwide each year at a cost to the producer and even greater cost to the environment.

In general, cement manufacturers deliberately produce cement having a broad particle size distribution (PSD) to create better packing between the cement particles, decrease interparticulate spacing, increase cement paste density and strength, improve flowability, and reduce autogenous shrinkage.

BRIEF SUMMARY OF DISCLOSED EMBODIMENTS

Hydraulic cements, such as Portland cements, that hydrate when mixed with water, are particle size optimized to have increased reactivity and/or decreased water demand compared to hydraulic cements of similar chemistry and fineness. Increasing hydraulic cement reactivity increases early strength development and release of reactive calcium hydroxide, both of which enhance SCM replacement and 1-28 day strengths compared to traditional blends of Portland cement and SCMs. Decreasing the water demand improves workability at a given water-to-cement ratio, reducing the need for water reducers and other chemical admixtures, improving set time, and reducing shrinkage.

Improved reactivity and/or reduced water demand are achieved by designing hydraulic cement to have a relatively narrow PSD compared to conventional Portland cements (e.g., Types I-V), particularly when the cement is part of a cement-SCM blend having complementary-sized SCM particles that broaden the PSD of the overall blend compared to the cement fraction by itself. Narrowing the PSD of hydraulic cement is contrary to the conventional practice of maintaining a broad PSD. It also different than merely shifting the PSD curve to the left (e.g., to form Type III cement). In some cases, it may be desirable to not only reduce the d90 compared to OPC but maintain a similar d10 or even raise the d10 to reduce the quantity of ultrafine cement particles (e.g., below 1-5 µm), which increase water demand without providing a corresponding strength benefit and/or which can be beneficially augmented or replaced with ultrafine SCM particles (e.g., slower reacting or non-reactive SCM particles that can fill void spaces, reduce interstitial pore volume, improve water transport, and improve workability instead of dissolving immediately or shortly after adding water).

In one embodiment, the PSD of the disclosed hydraulic cements can be defined by the lower and upper PSD "endpoints" d10 and d90. The hydraulic cement can also be defined by the spread or difference between d90 and d10 ("d90–d10"). In another embodiment, the PSD of the cement particles can be defined by the upper and lower endpoint ratio d90/d10. In yet another embodiment, the PSD can be defined by the lower median range of d10 to d50. In still another embodiment, the PSD can be defined by the lower median ratio d50/d10. In another embodiment, the PSD can be defined by the upper median range of d50 to d90. In yet another embodiment, the PSD can be defined by the upper median ratio d90/d50 of the cement particles. The PSD can also be defined by any combination of the foregoing and/or using similar methods.

The narrow PSD cements can have a chemistry that further increases reactivity and their ability to be mixed and substituted with SCMs and/or fillers while maintaining high early strength. To further increase reactivity, it may be desirable to increase the amount of the more highly reactive constituents of cement, such as tricalcium silicate ($C_3S$) and/or tricalcium aluminate ($C_3A$). Increasing the initial heat of hydration by including faster reacting species can increase SCM substitution levels while maintaining early strength development. Clinker minerals may be amended with or replaced by magnesium silicate cement, which reduces $CO_2$ footprint through reduced production energy and/or partial $CO_2$ sequestration.

In some cases, narrow PSD hydraulic cements within the scope of the disclosure can be engineered to be so reactive as to require some level of SCM replacement due to excessive heat of hydration, water demand, and/or autogenous shrinkage. Such cements create synergy when replaced with substantial quantities of slower reacting SCMs by their greater ability to maintain acceptable set times and early strength and promote SCM reactivity, while the SCM can reduce the net heat of hydration, water demand, and/or autogenous shrinkage to normal or acceptable levels.

Hydraulic cements within the disclosure can be used for any desired purpose but are especially useful for increasing SCM replacement while maintaining similar early strength and/or water demand as 100% cement (e.g., binary blends, ternary blends, and quaternary blends having broader PSDs than the cement fraction by itself). An example binary blend includes a cement fraction having a d10 and d90 as disclosed herein and an SCM fraction that contributes more coarse particles above the d90 of the cement fraction and/or blend than the cement fraction itself. The SCM fraction may also contribute fine particles between the d10 and d90 of the cement fraction and/or ultrafine particles below the d10 of the cement fraction. The SCM fraction may contain one or more pozzolans and/or one or more ground SCM fillers, such as micronized limestone or quartz.

An example ternary blend includes a cement fraction that provides fine particles having a d10 and d90 as disclosed herein, a first SCM fraction, at least a portion of which contributes ultrafine particles below the d10 of the cement fraction, and a second SCM fraction, at least a portion of which contributes coarse particles above the d90 of the cement fraction. In one variation, the first SCM fraction may comprise a reactive SCM and the second SCM fraction may comprise the same or different reactive SCM. In another variation, the first and/or second SCM fraction may include a non-reactive SCM (or filler). Replacing at least a portion of ultrafine hydraulic cement particles with ultrafine SCM particles increases workability and reduces water demand, particularly when they remain in particulate form during mixing and placement of concrete instead of dissolving during mixing and prior to placement, as typically occurs with ultrafine hydraulic cement particles.

An example quaternary blend includes a cement fraction that provides fine particles having a d10 and d90 as disclosed herein, a first reactive and/or non-reactive SCM fraction that contributes ultrafine particles below the d10 of the cement fraction, a second reactive SCM fraction that contributes coarse particles above the d90 of the cement fraction, and a third nonreactive SCM (or filler) fraction that contributes coarse particles above the d90 of the cement fraction.

A beneficial use of highly reactive hydraulic cements is to increase the use of certain forms of coal ash, such as bottom ash and some types of fly ash, and other SCMs, such as metallurgical slag, that may be classified as "hazardous" or even "toxic" when unencapsulated (e.g., when used as road base, filler, or cement kiln feed or dumped into landfills or wet settling ponds). By encapsulating and sequestering hazardous or toxic metals or other elements within a rigid, largely waterproof cementitious matrix, the highly reactive hydraulic cements can effectively "dispose" of high amounts of such SCMS while beneficially utilizing their cementing properties.

The highly reactive narrow PSD cements disclosed herein can also be used with less reactive SCMs, including some types of fly ash, bottom ash and other materials that have insufficient reactivity to qualify under ASTM C-311 and/or which do not qualify under ASTM C-618, and non-reactive SCM fillers.

These and other advantages and features of the invention will become more fully apparent from the following description and appended claims, or may be learned by the practice of the invention as set forth hereinafter.

DETAILED DESCRIPTION OF THE PREFERRED EMBODIMENTS

I. Introduction

Figure 1A:
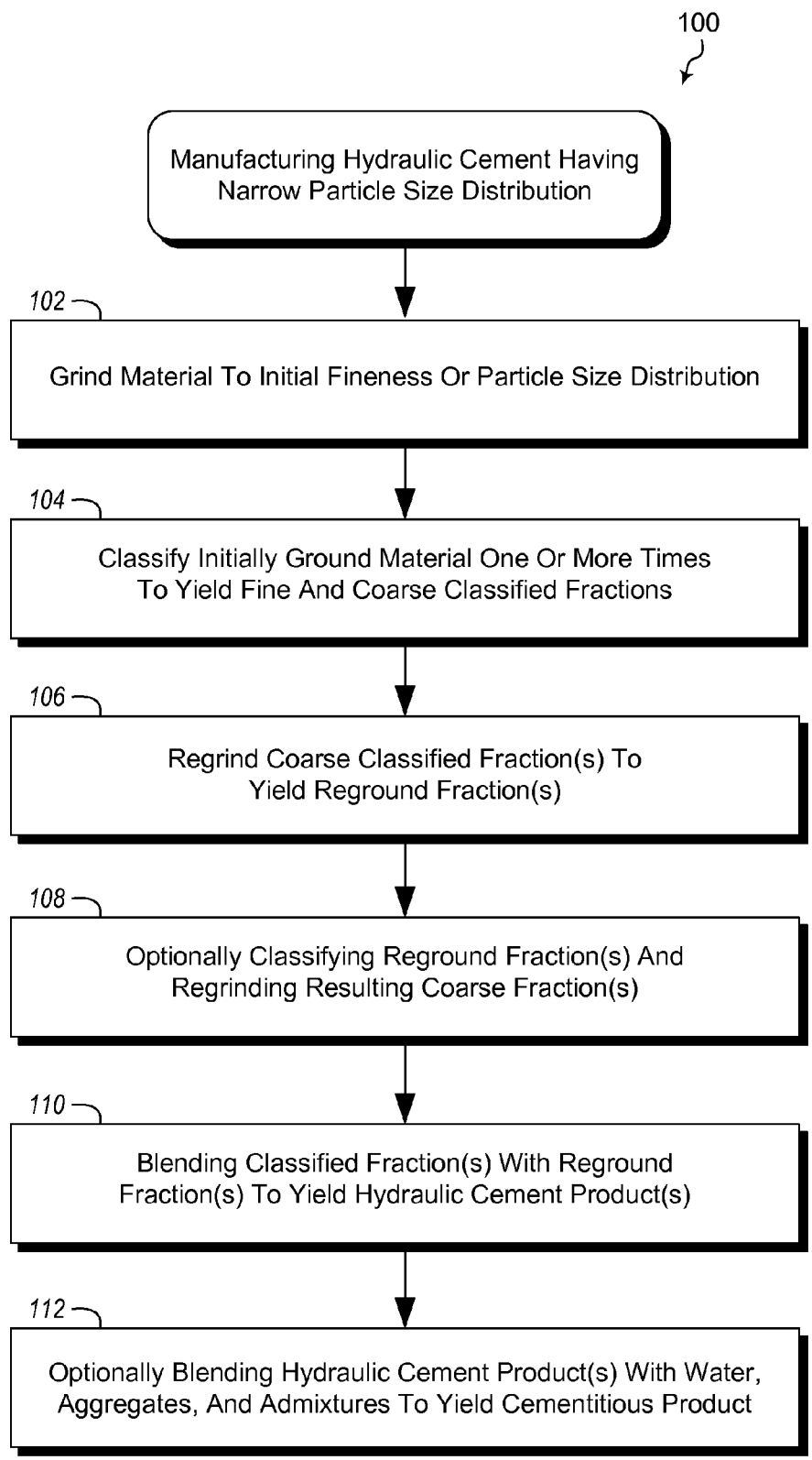
FIG. 1A is a schematic flow diagram of an example method of manufacturing hydraulic cement having a desired PSD.

The terms "hydraulic cement" and "cement", as used herein, include Portland cement and similar materials that contain one or more of the four clinker materials: $C_3S$ (tricalcium silicate), $C_2S$ (dicalcium silicate), $C_3A$ (tricalcium aluminate), and $C_4AF$ (tetracalcium aluminoferrite). Hydraulic cement can also include ground granulated blast-furnace slag (GGBFS) and other slags having a relatively high CaO content (which may also qualify as SCMs), white cement, calcium aluminate cement, high-alumina cement, magnesium silicate cement, magnesium oxychloride cement, oil well cements (e.g., Type VI, VII and VIII), and combinations of these and other similar materials.

The term "SCM", as used herein, shall refer to materials commonly understood in the industry to constitute materials that can replace a portion of Portland cement in concrete, either in blended cements or added by the end user when making concrete or other cementitious material. Examples include highly reactive materials (e.g., GGBFS), moderately reactive materials (e.g., Class C fly ash, steel slag, silica fume), lower reactive materials (e.g., Class F fly ash and metastable forms of $CaCO_3$), and non-reactive materials (e.g., ground limestone, ground quartz, and precipitated $CaCO_3$).

Hydraulic cements can be optimized to have increased reactivity and/or decreased water demand compared to cement of similar chemistry and fineness. They are especially useful for manufacturing cement-SCM blends which include one or more SCM materials that provide particles that are coarser, and optionally also finer, than the hydraulic cement fraction. In this way, the PSDs of the hydraulic cement and SCM fractions can complement each other and yield a blend having a PSD that is broader than the PSD of the cement fraction alone.

Increased hydraulic cement reactivity increases early strength development and release of reactive calcium hydroxide, which promote SCM replacement and can increase 1-28 day strengths compared to conventional Portland cement-SCM blends. Decreased water demand improves workability, reducing the need for water reducers and other chemical admixtures, and can reduce shrinkage.

In general, providing hydraulic cement with a d90 less than the d90 of hydraulic cement of similar chemistry increases overall reactivity by increasing the preponderance of smaller, more reactive cement particles (e.g., because of higher surface area). It also reduces the amount of unreacted (or wasted) cement that typically exists in fully hardened concrete. We have discovered, however, that simply grinding cement clinker more finely to lower the d90 (as is commonly done to produce Type III cement from Type I, II or V clinker) without also controlling the d10 to narrow the PSD can create excessive quantities of "ultrafine particles" (e.g., below about 1-3 microns), which can increase water demand and shrinkage without a providing a corresponding strength benefit. We have now discovered that narrowing the PSD of hydraulic cement by decreasing the d90 without proportionally lowering the d10 yields hydraulic cement that provides higher reactivity without proportionally increasing water demand and shrinkage.

Hydraulic cements having increased reactivity and/or decreased water demand compared to hydraulic cements of similar chemistry and/or fineness can be used for any desired purpose. In one embodiment, hydraulic cements within the scope of the disclosure are well-suited for making blended cements and/or cementitious mixes having relatively high SCM content. Blending a narrow PSD hydraulic cement with one or more SCMs that provide a substantial quantity of coarse particles above the d90 of the cement and/or a substantial quantity of ultrafine particles below the d10 of the cement can yield blended cement having a wider PSD (e.g., a Fuller distribution typical of OPC) and concrete having a wider distribution of binder particle sizes compared to the narrow PSD cement by itself. Depending on the PSD of the SCM fraction, it may be practicable to simply blend one or more SCMs without modification with a narrow PSD cement within the scope of the invention.

Cement-SCM blends made using the disclosed hydraulic cements can provide higher 1-28 day strengths compared to similarly proportioned "site blends" of Portland cement and SCM commonly prepared by concrete manufacturers. Inventive cement-SCM blends can also provide higher 1-28 day strengths compared to similarly proportioned blended cements as conventionally made by cement manufacturers (e.g., by intergrinding cement clinker and SCM or simply blending ordinary Portland cement and SCM). In addition, such blended cements can have lower water demand compared to conventional interground blended cements, which often have substantially higher fineness compared to both ordinary Portland cement and non interground blends of Portland cement and pozzolan and/or limestone.

Cement-SCM blends can be made at a grinding/blending facility, which may include grinding and classification apparatus for the cement, optional classification and/or grinding apparatus for the SCM, and mixing apparatus to form cement-SCM blends for sale to a concrete company. Alternatively, hydraulic cements according to the invention can be manufactured and sent to a dedicated blending facility for blending with SCM to yield cement-SCM blends and optionally with aggregates to yield dry concrete or mortar blends. In still another embodiment, hydraulic cements according to the invention can be manufactured and sent to a concrete manufacturing facility where they are blended on site with one or more SCMs, aggregates, water, and appropriate admixtures to yield a desired concrete or mortar composition.

II. Example Particle Size Ranges of Hydraulic Cement

Improved reactivity and/or reduced water demand are provided by narrow PSD hydraulic cements (e.g., Portland cements and other hydraulic cements that include substantial quantities of $C_3S$, $C_2S$ and/or $C_3A$). In one embodiment, the PSD of the cement can be defined by the lower and upper range "endpoints" d10 and d90, which can also define the spread (d90–d10). In another embodiment, the PSD can be defined by the upper and lower endpoint ratio d90/d10 of the cement particles. In yet another embodiment, the PSD can be defined by the lower median range of d10 to d50. In still another embodiment, the PSD can be defined by the lower median ratio d50/d10 of the cement particles. In another embodiment, the PSD can be defined by the upper median range of d50 to d90. In yet another embodiment, the PSD can be defined by the upper median ratio d90/d50 of the cement particles. The PSD of hydraulic cements can also be defined by more than one of these methodologies and/or other methodologies that can be derived therefrom. Once the principles of manufacturing narrow PSD hydraulic cements as disclosed herein are understood, one of skill in the art can construct other methodologies for defining the PSD in order to increase reactivity and/or decrease water demand compared to conventional Portland cements.

In order to ensure that the hydraulic cement has a PSD within the desired parameters, care should be taken to accurately determine particle size. The particle size of perfectly spherical particles can be measured by diameter. While fly ash is generally spherical owing to how it is formed, other SCMs and Portland cement can be non spherical (e.g., when ground from larger particles). For these, the "particle size" can be determined according to accepted methods for determining the particle sizes of ground or otherwise non spherical materials. Particle size can be measured by any acceptable method and/or methods that are yet to be developed. Examples include sieving, optical or electron microscope analysis, laser and/or x-ray diffraction, sedimentation, elutriation, microscope counting, Coulter counter, and Dynamic Light Scattering.

A. Defining PSD by Lower and Upper Endpoints D10 and D90

In a first embodiment, the d10 and d90 define the lower and upper "endpoints" of the PSD, although by definition about 10% of particles have a particle size less than the d10 and about 10% of particles have a particle size greater than the d90. In general, reactivity and fineness (e.g., Blaine) of the cement increase as the d90 decreases and water demand and fineness decrease as the d10 increases, all things being equal.

The upper endpoint d90 can be selected to provide a desired reactivity and/or fineness in conjunction with or independent of the lower endpoint d10. The d90 of hydraulic cements within the disclosure will generally be less than the d90 of Types I, II and V cement as defined by ASTM C-150 and can be less than the d90 of Type III cement within the meaning of ASTM C-150. According to several embodiments, the d90 can be equal to or less than about 30 µm, 25 µm, 22.5 µm, 20 µm, 17 µm, 14.5 µm, 13 µm, 12.5 µm, 11 µm, 10 µm, 9 µm, 8 µm, or 7.5 µm. The d90 can be as low as about 5 µm, 6 µm, 7 µm, 8 µm, 9 µm or 10 µm.

The lower endpoint d10 can be selected to provide a desired water demand and/or fineness in conjunction with or independent of the upper size endpoint d90. The d10 of hydraulic cements within the disclosure will generally be equal to or greater than 0.685 µm, can be greater than the d10 of Type III cement within the meaning of ASTM C-150, and can be greater than the d10 of Types I, II and V cement as defined by ASTM C-150. According to several embodiments of the invention, the d10 can be equal to or greater than about 0.65 µm, 0.70 µm, 0.75 µm, 0.85 µm, 1.0 µm, 1.15 µm, 1.3 µm, 1.5 µm, 1.75 µm, 2 µm, 2.5 µm, 3 µm, 4 µm, or 5 µm. The d10 limit can be as high as about 5 µm, 6 µm, 7 µm, or 8 µm.

In order to provide cement having a PSD that is narrower than a comparative conventional hydraulic cement (e.g., Types I-V Portland cement as defined by ASTM C150), the d90 of the cement can be less than, and the d10 can be greater than, the respective d90 and d10 of the conventional hydraulic cement. By way of example, a coarser hydraulic cement within the disclosure can have a d90 that is less than, and a d10 that is greater than, the respective d90 and d10 of a coarse Type I/II Portland cement having a d90 of 49.868 µm and a d10 of 1.85 µm. In another example, a hydraulic cement of medium fineness can have a d90 that is less than, and a d10 that is greater than, the respective d90 and d10 of a Type II/V Portland cement having a d90 of 32.912 µm and a d10 of 1.245 µm. In yet another example, a hydraulic cement of higher fineness can have a d90 that is less than, and a d10 that is greater than, the respective d90 and d10 of a finely ground Type III Portland cement having a d90 of 17.441 µm and a d10 of 0.975 µm.

The d90 and d10 can also define the spread (d90−d10) of the hydraulic cement. By way of example, depending on the d90 and d10 of the cement, the spread can be less than about 30 µm, 25 µm, 22.5 µm, 20 µm, 18 µm, 16 µm, 14, µm, 13, µm, 12 µm, 11 µm, or 10 µm. The spread may depend on processing equipment limitations.

B. Defining PSD by Upper and Lower Endpoint Ratio D90/D10

In a second embodiment, the ratio of upper and lower particle size endpoints d90/d10 can define cement having a desired reactivity and/or fineness. The ratio d90/d10 of disclosed cements will generally be less than the ratio d90/d10 of Types I, II and V cement as defined by ASTM C-150, and can be less than the ratio d90/d10 of Type III cement within the meaning of ASTM C-150. According to several embodiments, the ratio d90/d10 can be less than or equal to about 25, 22.5, 20, 17.5, 16, 14.5, 13, 11.5, 10, 9, 8, 7, 6, 5, 4.5, 4, 3.5, 3, 2.5 or 2.

By way of example, the coarse Type I/II cement mentioned above had a d90/d10 of 26.96, and the finer Type II/V cement had a d90/d10 of 26.44. A d90/d10 of less than 25 defines cement having a narrower PSD than these cements. In another example, a Type I cement having a d90 of 36.495 and a d10 of 1.551 had a d90/d10 of 23.53. A d90/d10 of less than 22.5 defines cement having a narrower PSD than this cement. In yet another example, the finely ground Type III cement mentioned above had a d90/d10 of 17.89. A d90/d10 of less than 17 defines cement having a narrower PSD than this cement.

It will be appreciated that defining the PSD by the ratio of d90/d10 is not limited by any particular d90 or d10 or range of particle sizes. For example, a first hypothetical cement having a d90 of 15 µm and a d10 of 3 µm has a d90/d10 of 5 and spread (d90−d10) of 12 µm. By comparison, a second hypothetical cement having a d90 of 28 µm and a d10 of 7 µm has a d90/d10 of 4 and a spread (d90-d10) of 21 µm. While the spread of the second hypothetical cement is greater, the d90/d10 is smaller compared to the first hypothetical cement. Thus, the second hypothetical cement has a narrower PSD compared to the first hypothetical cement as defined by d90/d10.

C. Defining PSD by Lower Median Range D10 to D50

In a third embodiment, the d10 and d50 can define the PSD of hydraulic cement particles. By definition, about 10% of the cement particles have a particle size less than the d10, and about 50% of the cement particles have a particle size greater than the d50. In general, reactivity and fineness (e.g., Blaine) of the hydraulic cement increase as the d50 decreases and water demand and fineness decrease as the d10 increases, all things being equal.

The upper endpoint d50 of the lower median range can be selected to provide a desired reactivity and/or fineness in conjunction with or independent of either the d10 or d90. The d50 of cements within the disclosure will generally be less than the d50 of Types I, II and V cement as defined by ASTM C-150, and can also be less than the d50 of Type III cement. According to several embodiments, the d50 can be less than or equal to about 16 µm, 14 µm, 12 µm, 10 µm, 9, µm, 8 µm, 7.5 µm, 6.75 µm, 6 µm, 5.5 µm, 5 µm, 4.75 µm, 4.5 µm, 4.25 µm, 4 µm, or 3.75 µm.

The lower endpoint d10 of the lower median range can be selected to provide a desired water demand and/or fineness in conjunction with or independent of either the d50 or d90. The d10 of hydraulic cements within the disclosure will generally be equal to or greater than 0.685 µm and can be greater than the d10 of Type III cement within the meaning of ASTM C-150. According to several embodiments, the d10 can be equal to or greater than about 0.65 µm, 0.70 µm, 0.75 µm, 0.85 µm, 1.0 µm, 1.15 µm, 1.3 µm, 1.5 µm, 1.75 µm, 2 µm, 2.5 µm, 3 µm, 4 µm, or 5 µm. The d10 can be as high as about 5 µm, 6 µm, 7 µm, or 8 µm.

In order to provide cement having a PSD that is narrower than a comparative conventional hydraulic cement (e.g., Types I-V Portland cement as defined by ASTM C150), the d50 of the cement can be less than, and the d10 can be greater than, the respective d50 and d10 of the conventional hydraulic cement. For example, a coarser hydraulic cement within the disclosure can have a d50 that is significantly less than, and a d10 that is significantly greater than, the respective d50 and d10 of a coarse Type I/II Portland cement having a d50 of 17.78 µm and a d10 of 1.85 µm. In another example, a hydraulic cement of medium fineness can have a d50 that is significantly less than, and a d10 that is significantly greater than, the respective d50 and d10 of a Type II/V Portland cement having a d50 of 11.237 µm and a d10 of 1.245 µm. In yet another example, a hydraulic cement of higher fineness can have a d50 that is significantly less than, and a d10 that is significantly greater than, the respective d50 and d10 of a finely ground Type III Portland cement having a d50 of 6.768 µm and a d10 of 0.975 µm.

D. Defining PSD by Lower Median Ratio D50/D10

In a fourth embodiment, the lower median particle size ratio d50/d10 can define cement having a desired reactivity and/or fineness. The ratio d50/d10 of cements within the disclosure will generally be less than the ratio d50/d10 of Types I, II and V cement as defined by ASTM C-150, and can be less than the ratio d50/d10 of Type III cement within the meaning of ASTM C-150. According to several embodiments, the ratio d50/d10 can be less than or equal to 8.5, 7.5, 6.85, 6.4, 6.1, 5.75, 5.5, 5.25, 5, 4.8, 4.6, 4.4, 4.2, 4, 3.8, 3.6, 3.4, 3.25, 3.1, 3, 2.75, 2.5, 2.25, 2 or 1.75.

For example, the coarse Type I/II cement mentioned above had a d50/d10 of 9.6, and the Type II/V cement had a d50/d10 of 9.02. A d50/d10 of less than 8.5 would define cement having a narrower PSD compared to these cements. In another example, the Type I cement mentioned above had a d50/d10 of 7.64. A d50/d10 of less than 7.5 would define cement having a narrower PSD compared to this cement. In yet another example, the Type III cement mentioned above had a d50/d10 of 6.94. A d50/d10 of less than 6.85 would define cement having a narrower PSD compared to this cement.

E. Defining PSD by Upper Median Range D50 to D90

In a fifth embodiment, the d50 and d90 can be utilized to define the upper median range of the cement particles. By definition about 50% of the cement particles have a particle size less than the d50, and about 10% of the cement particles have a particle size greater than the d90. In general, the reactivity and fineness (e.g., Blaine) of the hydraulic cement increase as the d50 decreases, and water demand and fineness decrease as the d90 increases, all things being equal.

The lower endpoint d50 of the upper median range can be selected to provide a desired reactivity, water demand and/or fineness in conjunction with or independent of either the d90 or d10. The d50 of hydraulic cements according to the invention will generally be less than the d50 of Types I, II and V cement as defined by ASTM C-150, and may also be less than the d50 of Type III cement within the meaning of ASTM C-150. According to several embodiments, the d50 can be less than or equal to 16 μm, 14 μm, 12 μm, 10 μm, 8 μm, 6.75 μm, 5.5 μm, 5 μm, 4.75 μm, 4.5 μm, 4.25 μm, 4 μm, or 3.75 μm and/or greater than or equal to 2.25 μm, 2.5 μm, 2.75 μm, 3 μm, 3.25 μm, 3.5 μm, 4 μm, 4.5 μm, 5 μm, 5.75 μm, 6.5 μm, 8 μm, 10 μm or 12 μm.

The upper endpoint d90 of the upper median range can be selected to provide a desired reactivity, water demand and/or fineness in conjunction with or independent of either the d10 or d50. The d90 of hydraulic cements according to the invention will generally be less than the d90 of Types I, II and V Portland cement as defined by ASTM C150 and can also be less than the d50 of Type III cement. According to several embodiments, the d90 can be less than or equal to 30 μm, 25 μm, 22.5 μm, 20 μm, 17 μm, 14.5 μm, 13 μm, 12.5 μm, 11 μm, 10 μm, 9 μm, 8 μm, or 7.5 μm. The lower d90 limit can be about 5 μm, 6 μm, 7 μm, 8 μm, 9 μm or 10 μm.

F. Defining PSD by Upper Median Ratio D90/D50

According to another embodiment, the upper median particle size ratio d90/d50 can define cement having a desired reactivity and/or fineness. Depending on how the grinding and/or classification processes are carried out, the ratio d90/d50 of hydraulic cements according to the invention can be similar to or greater than the ratio d90/d50 of Types I, II and V cement as defined by ASTM C150, and can be greater than the ratio d90/d50 of Type III cement within the meaning of ASTM C150. According to several embodiments of the invention, the ratio d90/d50 can be in a range of about 1.25 to 5, about 1.4 to 4.5, about 1.75 to about 4.25, about 2.5 to 4, about 2.6 to 3.85, about 2.7 to 3.7, about 2.8 to 3.6, about 2.9 to 3.5, or about 3 to 3.4.

By way of example, the coarse Type I/II cement mentioned above had a d90/d50 of 2.805, and the relatively finer Type II/V cement had a d90/d50 of 2.929. A d90/d50 greater than 3 would define cement having a broader upper median ratio of particle sizes compared to these cements. In another example, the Type I cement mentioned above had a d90/d50 of 3.081. A d90/d50 greater than 3.1 would define cement having a broader upper median ratio of particle sizes compared to this cement. In yet another example, the Type III cement mentioned above had a d90/d50 of 2.577. A d90/d50 greater than 2.6 would define cement having a broader upper median ratio of particle sizes compared to this cement. Alternatively, the d90/d50 of the inventive hydraulic narrow PSD cements can be less than those of commercial cements.

III. Example Blends Made Using the Disclosed Cements

Hydraulic cements within the disclosure can be used for any desired purpose but are especially useful for increasing SCM replacement while maintaining similar early strength and/or water demand as 100% cement. By way of example, narrow PSD hydraulic cements can be used to make binary blends, ternary blends, and quaternary blends, which will typically have a broader PSD than the cement fraction by itself. Blends made using narrow PSD cements can unlock more of the early binding ability of the cement fraction by utilizing finer, more reactive particles that become substantially or fully hydrated in the short term (e.g., 1 day, 3 days, 7 days, or 28 days). Rapid hardening or flash setting of the cement fraction is controlled and water demand reduced by utilizing SCM particles that disperse and separate the hydraulic cement particles. Replacing at least a portion of ultrafine cement particles with ultrafine SCM particles can further decrease water demand, particularly where the ultrafine SCM particles do not dissolve during mixing and prior to placement of concrete, as typically occurs with hydraulic cements such as Portland cement. SCM particles also contribute to long-term strength development. In this way, the hydraulic cement and SCM fractions are put to their highest respective uses. This is referred to herein as "particle-size-optimized blended cement."

In general, and in contrast to conventional Portland cement and cement-SCM blends, the Portland cement fraction of cement-SCM blends disclosed herein does not utilize a normal distribution of cement particles but rather narrower PSD of Portland cement blended with complementary-sized SCM particles. In essentially all embodiments, all or a substantial portion of the larger particles (e.g., above 10-25 comprise SCM particles. In some embodiments, all or a substantial portion of the ultrafine particles of the blend (e.g., below 1-5 μm) comprise SCM particles.

In example embodiments of blended cements, the d85, d90, d95 or d99 of the hydraulic cement particles may be less than about 25 μm, 22.5 μm, 20 μm, 17.5 μm, 15 μm, 12.5 μm, 10 μm, 7.5 μm, or 5 μm. In one embodiment, the d1, d5, d10, d15, or d20 of the hydraulic cement may be greater than about 1 μm, 1.25 μm, 1.5 μm, 1.75 μm, 2 μm, 2.25 μm, 2.5 μm, 3 μm, 3.5 μm, 4 μm, 4.5 μm, or 5 μm. While cement-SCM blends can utilize a hydraulic fraction with a PSD similar to Type III cement, the PSD can be narrower than the PSD of Type III cement (e.g., by having a higher d10 and/or lower d90). Reducing the amount of ultrafine cement particles below about 1 μm, 1.5 μm, 2 μm, 2.5 μm or 3 μm compared to many Type III cements reduces water demand, reduces the risk of flash setting, decreases grinding costs, and can result in higher ultimate strength. Reducing the amount of coarse cement particles above about 10 μm, 12.5 μm, 15 μm, 17.5 μm, or 20 μm compared to many Type III cements reduces the amount of cement that remains unhydrated after 28 days.

In one embodiment, the PSD of a coarse SCM fraction in blended cements can be similar to that of larger particle fractions found in OPC (e.g., 10-45 μm). According to one embodiment, the d20, d15, d10, d5 or d1 of the coarse SCM fraction is at least about 5 μm, 7.5 μm, 10 μm, 12.5 μm, 15 μm, 17.5 μm, 20 μm, 22.5 μm, or 25 μm. The coarse SCM fraction can also have a desired distribution in which the d80, d85, d90, d95, or d99 is less than about 120 μm, 100 μm, 80 μm, 60 μm, 50 μm, or 45 μm.

An ultrafine SCM fraction with a d85, d90, d95 or d99 less than about 5 μm, 4.5 μm, 4 μm, 3.5 μm, 3 μm, 2.5 μm, or 2 μm (e.g., with particles spanning about 0.1-3 μm) may be desirable to help disperse the finer cement particles, increase fluidity, and increase strength. Fine SCM particles (e.g., about 3-15 μm) may be included so long as they increase strength development without unduly increasing water demand.

Example binary blends include a hydraulic cement fraction having a relatively narrow PSD (e.g., d10=about 1-3 µm and d90=about 10-20 µm) and an SCM fraction that contributes more coarse particles above the d90 of the hydraulic cement fraction and/or the blend than the cement fraction. The SCM fraction may also contribute fine particles between the d10 and d90 of the hydraulic cement fraction and/or ultrafine particles below the d10 of the hydraulic cement fraction. By way of example, the SCM fraction may contain one or more reactive SCMs (e.g., pozzolan) and/or one or more ground SCM fillers, such as micronized limestone or quartz.

Example ternary blends include a coarse SCM fraction, a fine hydraulic cement (e.g., Portland cement) fraction, and an ultrafine SCM fraction. The PSD of the entire ternary blend or the combined coarse SCM and fine hydraulic cement fractions can be similar to those described above relative to binary blends. The ultrafine SCM fraction may have a PSD where the d85, d90, d95, or d99 is less than about 5 µm, 4.5 µm, 4 µm, 3.5 µm, 3 µm, 2.5 µm, 2 µm, 1.5 µm, or 1 µm. In one embodiment, the ultrafine SCM fraction can be a comminuted fraction obtained from classifying an SCM to yield an intermediate fine fraction and a coarse fraction and then comminuting at least a portion of the fine fraction to obtain the ultrafine PSD. Very coarse SCM particles (e.g., above 45 µm, 50 µm, 60 µm, 80 µm, 100 µm, or 120 µm) can be comminuted to form less coarse SCM particles having increased reactivity.

In one aspect, an example ternary blend can include a hydraulic cement fraction that provides relatively fine particles having a d10 and d90 as disclosed herein (e.g., d10=about 0.75-5 µm or 1-3 µm and d90=about 7.5-22.5 µm or 10-20 µm), a first SCM fraction, at least a portion of which contributes ultrafine particles below the d10 of the hydraulic cement fraction (e.g., <about 0.75-5 µm or 1-3 µm), and a second SCM fraction, at least a portion of which contributes coarse particles above the d90 of the hydraulic cement fraction (e.g., >about 7.5-22.5 µm or 10-20 µm). According to one embodiment, the first SCM fraction may comprise a reactive SCM, such as a pozzolan or a slag having cementitious properties (e.g., GGBFS), which can help disperse and reduce flocculation of the finer cement particles and/or contribute to early strength development. According to another embodiment, the second SCM fraction may comprise the same or different reactive SCM, which can help reduce the surface area and water demand of the blended cement and contribute to long-term strength development. Alternatively, at least a portion of the first and/or second SCM fractions may comprise a non-reactive SCM (or inert filler), such as limestone or quartz, which can help reduce surface area and water demand and/or provide nucleation sites that promote earlier and more orderly formation of hydration products to assist in early strength development.

In another aspect, example ternary blends can include: 1) a coarse fraction (e.g., particles above about 10-20 µm) that mostly comprise SCM (e.g., pozzolan, slag and/or filler) particles, 2) a fine fraction (e.g., particles ranging from about 1-3 µm at the lower end to about 10-20 µm at the upper end) that mostly comprise hydraulic cement particles, and 3) an ultrafine fraction (e.g., particles below about 1-3 µm) that at least partially or mostly comprise SCM. By way of example, the particle size of ultrafine pozzolan or other SCM particles in one illustrative example can span from about 0.1-5 µm (e.g., 0.1-3 µm), a substantial majority (e.g., 70% or more) of the hydraulic cement fraction can span from about 3-20 µm (e.g., 2-15 µm), and the particle size of coarse pozzolan particles can span from about 10-80 µm (e.g., 15-60 µm). An optional fine pozzolan or other SCM fraction can substantially overlap or span the PSD of the hydraulic cement but will typically contribute fewer particles over this range. In some cases, the pozzolan or other SCM fraction in a "ternary blend" of pozzolan and hydraulic cement can have a PSD similar or identical to that of ordinary fly ash.

An example quaternary blend includes a hydraulic cement fraction that provides fine particles having a d10 and d90 as disclosed herein (e.g., d10=about 1-5 or about 1-3 µm and d90=about 7.5-22.5 µm or 10-20 µm), a first SCM fraction (reactive and/or nonreactive) that contributes ultrafine particles below the d10 of the hydraulic cement fraction (e.g., <about 1-5 µm or about 1-3 µm), a second reactive SCM fraction that contributes coarse particles above the d90 of the hydraulic cement fraction (e.g., >about 7.5-22.5 µm or 10-20 µm), and a third nonreactive SCM (or inert filler) fraction that contributes coarse particles above the d90 of the hydraulic cement fraction (e.g., >about 10-20 µm), which may be coarser than the section reactive SCM fraction to further reduce water demand.

Example cement-SCM blends include at least about 10%, 20%, 25%, 30%, 35%, 40%, 45%, 50%, 55%, 60%, 65%, or 70% SCM by weight and less than about 90%, 80%, 75%, 70%, 65%, 60%, 55%, 50%, 45%, 40%, 35%, or 30% hydraulic cement by weight. In example blends, the volume percent of SCM in the cement-SCM blend can be in a range from about 10-80%, 10-60%, 10-45%, 15-40%, or 20-35%.

In some embodiments, it has been found that having more Portland cement than SCM can be useful for matching the strength development of ordinary Portland cement. This can be advantageous where a general purpose ("plug and play") blended cement is desired to substitute for OPC. Alternatively, the combined amount of Portland cement and highly reactive SCM (e.g., GGBFS) can exceed the amount of a less reactive pozzolan (e.g., fly ash) and/or combined amount of less reactive pozzolan and non-reactive filler. Plug and play blended cements make it possible for single-silo concrete producers that currently cannot produce concrete with SCMs to, for the first time, manufacture concrete having significant to high quantities of SCMs. In other cases, it may be desirable to provide a cement-SCM blend having higher strength than an equivalent volume of OPC in order to reduce the binder content in concrete and/or permit users to blend in additional SCMs and/or fine aggregate filler and/or increase the water-to-cement ratio as desired while maintaining desired or acceptable early strength. Multiple blended cements with different SCM contents can be provided to multi-silo producers to provide additional choices and/or ability to produce additional blends by proportioning two or more different blended cements as desired.

It will be appreciated that, all things being equal, applications that involve high temperatures, such as thick slab concrete that creates high internal heat of hydration and oil well cementing that involves high subterranean temperatures, may benefit from even higher SCM replacement levels in order to mitigate and therefore moderate the natively high reactivity of the hydraulic cement fraction.

Example cement-SCM blends can include a distribution of particles spread across a wide range of particle sizes (e.g., over a range of about 0.1-120 µm, or about 0.1-100 µm, or about 0.1-80 µm, or about 0.1-60 µm, or about 0.1-45 µm). According to one embodiment, the cement-SCM blend may have a PSD that approximates the PSD of OPC (e.g., to approximate a Fuller distribution).

In one embodiment, at least about 50%, 65%, 75%, 85%, 90%, or 95% of the "coarse" particles in example blended cements (e.g., the combined SCM and hydraulic cement particles larger than about 25 µm, 22.5 µm, 20 µm, 17.5 µm, 15 µm, 12.5 µm, 10 µm, 7.5 µm, or 5 µm) comprise SCM and less than about 50%, 35%, 25%, 15%, 10%, or 5% comprise hydraulic cement. At least about 50%, 65%, 75%, 85%, 90%, or 95% of the "fine" particles in example blended cements (e.g., the combined SCM and hydraulic cement particles between about 1-25 μm, 2-20 μm, or 3-15 μm) may comprise hydraulic cement, and less than about 50%, 35%, 25%, 15%, 10%, or 5% may comprise SCM. At least about 30%, 40%, 50%, 65%, 75%, 85%, 90%, or 95% of the "ultrafine" particles in example blended cements (e.g., the combined SCM and hydraulic cement particles less than about 5 μm, 4.5 μm, 4 μm, 3.5 μm, 3 μm, 2.5 μm, 2 μm, 1.5 μm, or 1 μm) may comprise SCM and less than about 70%, 60%, 50%, 35%, 25%, 15%, 10%, or 5% may comprise hydraulic cement.

In one embodiment, a coarse SCM fraction can have an average particle size (e.g., as exemplified by the d50) that exceeds the average particle size (e.g., d50) of the hydraulic cement fraction. In general, the average particle size (e.g., d50) of the coarse SCM fraction is in a range of about 1.25 times to about 25 times the average particle size (e.g., d50) of the hydraulic cement fraction, or about 1.5 times to about 20 times, or about 1.75 times to about 15 times, or about 2 times to about 10 times the average particle size of the hydraulic cement fraction. Similarly, the surface area or Blaine fineness of the hydraulic cement fraction may be about 1.25 times to about 25 times that of the coarse SCM fraction, or about 1.5 times to about 20 times, or about 1.75 times to about 15 times, or about 2 times to about 10 times the surface area or Blaine fineness of the coarse SCM fraction.

In the case of a ternary blend containing an ultrafine SCM fraction, the surface area or Blaine fineness of the hydraulic cement fraction will be less than that of the ultrafine SCM fraction. According to one embodiment, an ultrafine SCM fraction can have an average particle size (e.g., as exemplified by the d50) that is less than the average particle size (e.g., d50) of the hydraulic cement fraction. In general, the average particle size (e.g., d50) of the hydraulic cement fraction is in a range of about 1.25 times to about 25 times the average particle size (e.g., d50) of the ultrafine SCM fraction, or about 1.5 times to about 20 times, or about 1.75 times to about 15 times, or about 2 times to about 10 times the average particle size of the ultrafine SCM fraction. Similarly, the surface area or Blaine fineness of the ultrafine SCM fraction may be about 1.25 times to about 25 times that of the hydraulic cement fraction, or about 1.5 times to about 20 times, or about 1.75 times to about 15 times, or about 2 times to about 10 times the surface area or Blaine fineness of the hydraulic cement fraction.

The hydraulic cement and SCM particles that make up cement-SCM blends can overlap, although different PSD fractions of the overall PSD will generally contain predominant quantities of one type of material compared to materials that predominate in other PSD fractions. By way of example, coarse and/or ultrafine SCM fractions may contain some quantity of fine particles that overlap those of the hydraulic cement fraction. The amount of particle size overlap will generally depend on the d50 and PSD spread of the different materials. The amount of overlap of any given fraction relative to another fraction can be at least about 1%, 2.5%, 5%, 10%, 15%, 20%, 25%, 35% or 50% but will generally not exceed about 75%.

Nevertheless, the coarse SCM fraction will have a d50 that exceeds the d50 of the fine hydraulic cement fraction, and the ultra fine SCM fraction will have a d50 that is less than the d50 of the fine hydraulic cement fraction. According to one embodiment, the ratio d50/d50 of the fine hydraulic cement fraction to the ultrafine SCM fraction can be at least about 1.5, 2, 2.5, 3, 3.5, 4, 4.5, 5, 6, 7, 8, 9 or 10. Similarly, the ratio d50/d50 of the coarse SCM fraction to the fine hydraulic cement fraction can be at least about 1.5, 1.75, 2, 2.25, 2.5, 2.75, 3, 3.25, 3.5, 3.75, 4, 4.5 or 5.

The difference between the d50 of the fine hydraulic cement fraction and the d50 of the ultrafine SCM fraction can be at least about 3 μm, 4 μm, 5 μm, 6 μm, 7 μm, 8 μm, 9 μm, 10 μm, 11 μm, or 12 μm but will generally be less than 18 μm. The difference between the d50 of the coarse SCM fraction and the d50 of the ultrafine hydraulic cement fraction can be at least about 5 μm, 6 μm, 8 μm, 10 μm, 12 μm, 15 μm, 20 μm, 25 μm or 30 μm but will generally be less than about 50 μm.

According to one embodiment, the surface area of the hydraulic cement fraction (or combined fine cement and ultrafine SCM fractions) can be at least about 500 $m^2$/kg, or at least about 550 $m^2$/kg, or at least about 600 $m^2$/kg, or least about 650 $m^2$/kg, or at least about 700 $m^2$/kg, or at least about 800 $m^2$/kg, or at least about 900 $m^2$/kg, or at least about 1000 $m^2$/kg. Conversely, the surface area of the coarse SCM fraction can be less than about 600 $m^2$/kg, or less than about 550 $m^2$/kg, or less than about 500 $m^2$/kg, or less than about 475 $m^2$/kg, or less than about 450 $m^2$/kg, or less than about 425 $m^2$/kg, or less than about 400 $m^2$/kg, or less than about 375 $m^2$/kg, or less than about 350 $m^2$/kg.

Example cement-SCM blends can have a surface area (e.g., as estimated from the PSD or performing a Blaine test) and/or PSD (e.g., as described by the Rosin-Rammler-Sperling-Bennet distribution) that approximates that of OPC (e.g., a Fuller distribution). In this way, cement-SCM blends can behave similar to OPC in terms of water demand, rheology, and strength development. Example cement—SCM blends can have an overall surface area of about 250-750 $m^2$/kg, or about 280-700 $m^2$/kg, or about 300-650 $m^2$/kg, or about 325-600 $m^2$/kg, or about 350-550 $m^2$/kg.

Example cement-SCM blends can substitute for OPC in conventional concrete, including Types I, II, III, IV and V cements. They can have set times and other performance characteristics that fall within the ranges of ASTM C-150 in order to serve as a substitute for Type I, Type II, Type III, Type IV or Type V cement in the ready mix industry. The initial set time can be in a range of about 30-500 minutes, or about 45-400 minutes, or about 60-350 minutes, or about 90-250 minutes. They can also substitute for conventional oil well cements, including Types VI, VII and VIII.

Example cement-SCM blends can include inert fillers such as ground stone, rock and other geologic materials (e.g., ground granite, ground sand, ground bauxite, ground limestone, ground silica, ground alumina, and ground quartz). The terms "inert filler" and "nonreactive SCM" refer to materials that do not have cementitious or even pozzolanic properties. According to one embodiment, the inert filler may include coarser particles (e.g., about 20-300, 25-200, or 30-100 μm).

A. Hydraulic Cement

Ordinary Portland cement (OPC) (Types I-V) and oil well cement (Types VI-VIII) are typically manufactured by grinding cement clinker into a fine powder, typically so as to include a range of particle sizes that span from about 0.1-45 μm for OPC. In contrast to site blends of OPC and SCM, example cement—SCM blends do not contain a "normal" or conventional PSD of Portland cement but rather a narrower distribution. All or a substantial portion of the "coarse" hydraulic cement particles are removed, reground into finer particles, and replaced with SCM particles. Replacing the coarse hydraulic cement particles with SCM particles reduces cost, $CO_2$ output, and deleterious effects caused by including too much cement (e.g., creep, shrinkage, alkali-silica reaction, carbonation, and decreased durability). In some cases, narrow PSD cements within the disclosure may not work well by themselves but require blending with one or more SCMs to perform properly.

When making cement-SCM blends, it may be desirable to increase the amount of tricalcium silicate and/or tricalcium aluminate compared to OPC in order to increase early strength development and/or provide a desired heat of hydration and/or provide additional free lime that can react with the SCM. These can increase SCM substitution levels. For example, the tricalcium silicate content can be greater than about 50%, 57%, 60%, 62.5%, or 65%. The increased tricalcium silicate content of the cement fraction can offset a dearth or lack of calcium silicates in the pozzolan fraction. When increasing the d90 and/or d10 of the hydraulic cement to reduce water demand and/or autogenous shrinkage it may be desirable to offset early strength loss by increasing the tricalcium silicate content to about 65% or greater, about 70% or greater, or even about 75% or greater. Excessive reactivity of such materials can be offset by an increase in SCM replacement to create a desired net reactivity of the blend.

In addition to or instead of increasing the tricalcium silicate content, the tricalcium aluminate content can be greater than 5%, or greater than about 7.5%, or greater than about 10%, or even greater than about 12.5%, particularly where it is desired to increase the d90 and/or d10 of the hydraulic cement to reduce water demand and/or autogenous shrinkage. In the case where the d90 and/or d10 and not the chemistry is that main driving force for increased reactivity, the tricalcium aluminate can be in a range of 5.25% to about 11.75%, or about 5.5% to about 11.5%, or about 6% to about 11.25, or about 7% to about 11%. The increased tricalcium aluminate content of the cement fraction can offset a dearth or lack of calcium aluminates in the SCM fraction. The optimum quantity of tricalcium aluminate provided by the hydraulic cement may depend on the amount of calcium aluminates provided by the SCM. For example, class C fly ash, some slags and other SCMs can contribute greater quantities of calcium aluminates compared to class F fly ash.

An appropriate quantity of sulfate can be included based on the total calcium aluminates in the cement-SCM blend to provide the proper sulfate balance (e.g., for proper hydration and/or reduction in delayed ettringite formation, or sulfate attack). On the other hand, research suggests that aluminate contributed by tetracalcium aluminoferrate can mitigate against sulfate attack.

B. SCMs

Pozzolans and other reactive SCMs are materials that contain constituents which will combine with free lime at ordinary or elevated temperatures in the presence of water to form stable insoluble CSH compounds possessing cementing properties. Natural pozzolans can include materials of volcanic origin, but include diatomaceous earths and trass. Ground limestone, ground quartz, other ground filler materials, and precipitated $CaCO_3$ may be considered to be "SCMs" to the extent they can promote formation of hydration products or otherwise increase strength (e.g., by reducing the water-to-cement ratio required to give a desired workability). Artificial pozzolans are mainly products obtained by heat treatment of natural materials such as clay, shale and certain siliceous rocks, pulverized fuel ash, biomass ash (e.g., rice husk ash, sugar cane ash, and the like), Class F and Class C fly ash, bottom ash, slag, GGBFS, steel slag, silica fume, ground glass, and metakaolin. GGBFS, other types of slag, and Class C fly ash can have varying levels of self-cementing properties and can sometimes function as a hydraulic cement notwithstanding their quality as SCMs.

The PSD of a given SCM can be selected to maximize a desired benefit, including cost and performance. Because coarse Portland cement particles do not fully hydrate and include sacrificial cores that mainly perform as expensive filler, one function of a coarse SCM is to replace more expensive and more environmentally taxing coarse Portland cement particles with less expensive and more environmentally friendly SCM particles in order to provide a desired particle gradation and packing. Where the coarse SCM includes both reactive and non-reactive materials, it may be beneficial for the reactive SCM to be less coarse to increase reactivity and the nonreactive SCM to be coarser to further reduce cost.

Ultrafine SCM particles can also beneficially supplement and/or replace ultrafine Portland cement particles found in OPC. Because even reactive SCM particles are typically less reactive than Portland cement particles and do not dissolve as readily, providing less reactive and/or non-reactive SMC particles in the ultrafine fraction can increase strength and reduce water demand by beneficially filling capillary pore spaces between the fine cement particles, which increases paste density. Reactive ultrafine SCM particles also contribute to cement gel formation. Non-reactive ultrafine SCM particles such as limestone can provide nucleation sites for formation of cement hydration products. In one example, the coarse SCM can be lower cost fly ash and the ultrafine SCM can be higher reactive GGBFS and/or silica fume to maximize their respective benefits. In another example, the coarse SCM can be higher reactive GGBFS that continues to hydrate over time and the ultrafine SCM can be silica fume and/or finely ground fly ash.

Pozzolans with more uniform surfaces (e.g., spherical or spheroidal) may be desirable to reduce water demand. Fly ash is generally spherical in shape. Examples of spheroidal or globular pozzolans are disclosed in U.S. Publication No. 2010/0243771 to Mckee, which is incorporated by reference. Examples of reactive and non-reactive forms of precipitated $CaCO_3$ formed by reacting $CO_2$ from flue gas and calcium and/or magnesium ions in sea water are disclosed in U.S. Publication No. 2009/0020044 to Constantz et al., which is incorporated by reference.

It may be desirable to alter the chemistry of the SCM by amending the feed material with components that provide a desired SCM chemistry. For example, it can be desirable to inject materials into a coal burner, such as clays, ores, limestone, lime or other materials to yield coal ash having a chemistry that provides desired benefits, such as increased reactivity, strength development, cement compatibility, interaction with chemical admixtures, and the like. Slag and other byproduct SCMs can be modified by adding beneficial materials to a blast furnace or other high temperature process.

Various SCMs can be used in combination to provide desired benefits. For example, class F fly ash is typically effective in reducing sulfate attack and ASR while class C fly ash can provide higher early strength because of higher calcium content. However, some class F fly ashes can have excessively high carbon or other deleterious components and/or fail the C-618 reactivity standard, and some class C fly ashes may not properly mitigate sulfate attack and/or ASR. However, blending the two together can provide the best qualities and mitigate the weaknesses of both. One study showed that a blend of class F and C fly ash had greater reactivity than either the class F or C ahs by itself, which suggests a synergistic interaction.

Certain coal ashes, such as bottom ash and some fly ashes, metallurgical slags, and other SCMs may contain relatively high quantities of metals, arsenic or other potentially toxic or hazardous materials. In general, such materials are less toxic or hazardous when encapsulated and sequestered within hardened cementitious materials compared to simply being discarded into the environment in unencapsulated form (e.g., as road base, in landfills, dry storage mounds or wet ponds, or used as feed materials in cement kilns). Maximizing the quantity of such materials in cement blends can help in environmental remediation while also synergistically utilizing beneficial cementing properties in order to reduce the amount of hydraulic cement required to manufacture a given volume of concrete, mortar or oil well cement. Encapsulating SCMs that contain hazardous or toxic metals or other elements within a rigid, largely water-proof cementitious matrix can effectively "dispose" of such materials while beneficially utilizing their cementing properties. Discarded glass that may be an environmental nuisance and/or take up landfill space can be ground and beneficially used as SCM to replace a portion of the hydraulic cement.

In the case where a particularly toxic or hazardous SCM cannot be used in above-ground construction or exposed concrete, it can, for example, be beneficially used in SCM-filled oil well cement that is pumped below the ground surface, often hundreds or even thousands of feet below ground level. Subterraneous sequestration of toxic or hazardous SCMs in a solid, encapsulated form would greatly benefit the environment while synergistically promoting their use as a cement substitute, which further benefits the environment by reducing $CO_2$ emissions and fossil fuel usage. Gas well cementing and deep sea oil well cementing can provide similar benefits. In addition, high temperatures associated with subterranean oil and gas well cementing can further activate slower reacting SCMs, thereby increasing beneficial use of SCMs, including potentially hazardous or toxic SCMs and/or less reactive SCMs that may be insufficiently reactive to be useful in ready mix concrete. It will be understood that accelerating the reactivity of an SCM can accelerate the rate of encapsulation and sequestration of metals or other toxic elements in the SCM. It also makes possible the use of less reactive SCMs, such as pozzolans that are insufficiently reactive to qualify under ASTM C-311 and/or which do not qualify under ASTM C-618.

Sequestration of potentially labile metals in blended cements can be enhanced by including materials that can adsorb and sequester free metals. Examples of adsorbents include, but are not limited to, silica and alumina, which are often found in abundance in pozzolans and silica sand. Purified silica, alumina, and pozzolans (e.g., natural pozzolans) that contain silica and/or alumina and are deficient in labile metals can be added if needed to adsorb labial metals that can diffuse from certain SCMs.

IV. Methods and Apparatus for Manufacturing Hydraulic Cement and Cement-SCM Blends Example methods for manufacturing hydraulic cement include comminuting cement clinker to have a desired particle size distribution. Comminuting and properly recombining the entire mass of clinker to produce the final cement stream substantially maintains the same chemistry in the final product as in the original clinker. Simply separating out ultrafine and/or coarse particles from commercial Portland cement can significantly alter the cement chemistry of the recovered fraction because clinker minerals are often not evenly distributed throughout the entire particle size range. One or more online particle size analyzers can continuously monitor particle size. A control module running computer executable instructions can be configured to receive a series of readings from the online detector(s) and control one or more components of the grinding and separation system to achieve a desired PSD of hydraulic cement particles.

Any method for obtaining hydraulic cement having a desired particle size distribution and/or fineness can be used. In some cases, existing grinding and separation systems used to produce conventional Portland cement can be modified to produce narrow PSD cements as disclosed herein, such as through the use of higher efficiency separation techniques than are currently employed and/or by cutting at a lower d90 to yield a finished product with a desired d90 (e.g., between about 10-25 μm) without undesirably producing too many ultra fine particles below about 1-3 μm). In some cases, retrofitting an existing cement plant may be as simple as retuning one or more existing high throughput separators (e.g., manufactured by FLSmidth, which is located in the U.S., Denmark, Germany and India) and/or adding one or more high efficiency classifiers (e.g., manufactured by Netzsch, which is located in Germany) to make steeper cuts (e.g., at a desired d90).

In general, the energy used to grind or comminute a particle stream can increase exponentially as the particles become smaller, at least when using roll mills, ball bills and other conventional mechanical grinding systems currently used in the cement industry. Conventional roll mills and ball mills can efficiently grind clinker nodules to yield a relatively coarse particle stream (e.g., with a d10 of 25-50 μm and a d90 of 50-250 μm). However, energy requirements increase exponentially when the particles are ground to a typical d90 of 30-45 μm for general purpose cements. Reducing the d90 further to between 10-25 μm without system modification and by essentially shifting the entire PSD curve to the left could increase grinding costs by as much as 100-500%, which may be cost prohibitive and reduce cost savings and environmental benefits flowing from SCM replacement of Portland cement. Accordingly, another aspect of the disclosed technology is the ability to comminute clinker to form narrow PSD Portland cements while keeping grinding costs and energy consumption within an acceptable level compared to conventional grinding to make OPC. Depending on the efficiencies of grinding and separating particle streams, the cost can be the same or lower than the typical cost of comminuting clinker to form OPC.

One strategy for reducing cost is through high efficiency separation and removal of fine particles (i.e., dedusting) using a high efficiency classifier from an initial coarse particle stream produced by a high throughput cyclonic separator or air classifier and then comminuting the dedusted coarse particles. In this way, energy is not wasted regrinding already fine particles. Dedusting may be performed using high efficiency separators, such as those manufactured by Netzsch-Condux Mahltechnik GmbH, located in Hanau, Germany. It may also be accomplished using a series of less efficient but higher throughput classifiers to dedust multiple times to ensure substantial removal of the fine particles prior to regrinding the coarse particles.

Another strategy for reducing cost is to use equipment that is especially suited for comminuting relatively coarse particles into finer particles with narrow PSD. These include jet mills, ultrasonic fracturing mills, high pressure roll presses, fine grinding ball mills, dry bead mills, and even mills that may not be commonly used to grind Portland cement. While rod mills and ball mills can be very efficient in grinding clinker nodules to a relative coarse powder, non-traditional mills such as jet mills, dry bead mills, ultrasonic fracturing mills, can be as efficient, and in some cases more efficient, in comminuting an already ground powder into a finer powder having a desired narrow PSD. Fine grinding roll presses can also be used to controllably and inexpensively regrind a removed coarse fraction to yield the desired d90.

FIG. 1A is a flow chart illustrating an example method 100 for manufacturing hydraulic cement having a desired (e.g., narrow) PSD from clinker. The clinker can be a conventional clinker used to make Types I, II, III, IV or V Portland cement or a Type VI, VII or VIII oil well cement.

In a first act 102, cement clinker is ground into initially ground cement having an initial fineness and/or PSD. This can be accomplished using grinding apparatus such as, for example, one or more rod mills, roller mills and/or ball mills. A rod mill, such as a high pressure grinding roll, can be used to grind clinker to in intermediate ground cement having a relatively coarse particle distribution, and a ball mill can thereafter be used to produce cement having a finer particle distribution. The desired fineness and/or PSD of the initial cement may be selected based on subsequent classification and regrinding processes. The d10 of the initial ground cement will advantageously be as high or higher than the desired d10 of the final hydraulic cement product.

In a second act 104, the initial ground cement can be processed using one or more air classifiers to yield a plurality of classified cement fractions having different PSDs, including at least one finer fraction that may be collected without further modification and at least one coarser fraction that is reground (See FIGS. 2, 3A-3B, 4A-4C, 5A-5E and 6A-6E illustrating example configurations). A first classification process can be calibrated to yield a finer cement fraction having a desired d90, which may be equal to, approximate, or be within a specified deviation of the desired d90 of the final cement product. The finer cement fraction will typically have a lower d10 than the d10 of the initial ground cement by virtue of removing the coarser particles. The coarser fraction can optionally be dedusted one or more additional times to further remove remaining fine particles and yield a coarse cement that is better suited for subsequent milling without forming an excessive quantity of ultrafine cement particles. The fines produced by dedusting can be blended with the fine classified material by feeding it back into an initial high throughput separator.

In a third act 106, one or more coarse fractions produced by classification 104 are milled using an appropriate milling apparatus, such as a rod mill, fine grinding roll press, ball mill, impact ball mill, hammer mill, jet mill, dry bead mill, ultrasonic comminuting mill, or other mill designed to mill cement particles and yield one or more reground cement fractions having a desired d90 without producing an undesired quantity of ultrafine particles.

Optionally, a reground or milled cement intermediate can be classified one or more times by optional classifying act 108 to yield one or more additional fine cement fractions having a desired d90 and d10 and a coarser cement fraction that can be reground. The regrinding 106 and optional regrinding can be performed by the same or different grinding apparatus used for the initial grinding 102. If milling 106 is performed together with initial grinding 102, optional classifying 108 will typically be performed together or in parallel with initial classifying 104.

It may be desirable to employ one or more grinding-classification circuits that continuously grind, classify, and regrind (See FIGS. 2, 3A-3B, 4A-4C, 5A-5E and 6A-6E). In an example grinding-classification circuit, a clinker and/or coarse cement material is ground using one or more grinding apparatus (e.g., a single grinder, serial grinders and/or parallel grinders) to yield an intermediate cement material that is more finely ground than the initial feed material. The intermediate cement material is continuously fed from the grinder to one or more classifiers (e.g., a single classifier, serial classifiers and/or parallel classifiers) that produce one or more fine classified fractions and one or more coarse fractions. The one or more coarse fractions are continuously fed back into the grinding apparatus. In the case where the grinding apparatus includes a series of grinders that grind progressively finer cement feed materials, it may be advantageous to feed the one or more coarse classified fractions into the one or more dedicated fine grinding apparatus that receive feed cement having similar particle size distribution(s).

In yet another embodiment, a continuous operation can be achieved by operating a regrinding mill in parallel with a first grinder and one or more classifiers. Ground cement from the first grinder can be classified to produce a first fine product and a coarse fraction. At least a portion of the coarse fraction is reground in parallel in the regrinding mill to produce a second fine product that is thereafter mixed with the first fine product. Sulfate (e.g., as gypsum) may be added in the first grinder and/or the regrinding mill.

In one embodiment the coarse classified fraction may be reclassified in a second classification step. In this embodiment, the top (i.e., coarser fraction) of the coarse fraction can be recirculated to a first grinder and the bottom (i.e., finer fraction) of the coarse fraction can be delivered to a regrinding mill. In one embodiment, a particle size analyzer (optionally in conjunction with a computing device) monitors the particle size distribution of the first fine product and the second fine product and modifies the grinding mill and/or the regrinding mill and/or the one or more classifiers to provide a mixed cement product with a desired fineness and/or PSD.

The d90s of the fine classified and reground fine fractions can be the same as the d90 of the final hydraulic cement product. Alternatively, one or more of the fine fractions can have a d90 that is less than the d90 of the final hydraulic cement product and one or more of the other fine fractions can have a d90 that is greater than the d90 of the final hydraulic cement product. The d90s may depend on the relative quantities of first fractions to be blended together.

The reground fraction(s) may have a d10 that is less than, equals, or exceeds the desired d10 of the final cement product. Whether the d10 of the reground fraction(s) will have a d10 that is less than, equal to, or exceeds the d10 of the final product may depend on the relationship of the d10 of the classified fine fraction(s) and the reground fraction(s) to the desired d10 of the final cement product. In some cases, the d10 of the classified fine fraction(s) can be balanced with the d10 of the reground fractions(s) to yield a blended final cement product that has the desired d10.

In a fourth act 110, one or more classified fine fractions can be blended with one or more reground coarse fractions to yield one or more cement products having a desired d90 and d10. Such blending can occur using one or more high throughput cyclonic separators and/or air classifiers. As discussed above, the desired PSDs can be defined or selected based on any other criteria, including the alternative ways of defining the range of particle sizes set forth above, instead of or in addition to defining it by the d90 and d10. Blending can be performed by dedicated dry blending apparatus and/or one or more classifiers described above and/or illustrated in the Figures.

In an optional fifth act 112, the final cement product can be used to manufacture a desired cementitious product, such as premixed dry concrete or mortar. Alternatively, the cement product can be used to make freshly mixed cementitious products, such as ready mix concrete or oil well cement, that includes water and optionally one or more admixtures. Suitable admixtures may include, for example, water reducers (high range, mid range or low range), plasticizers, dispersants, set accelerators, retardants, hydration stabilizers, and water binding agents. One or more pozzolans can be added to the freshly mixed cementitious product. The term "freshly mixed" refers to a cementitious composition that includes hydraulic cement and water but has not yet reached initial set and can be formed and shaped into a desired structure or article of manufacture without damaging the cementitious material.

Figure 1B:
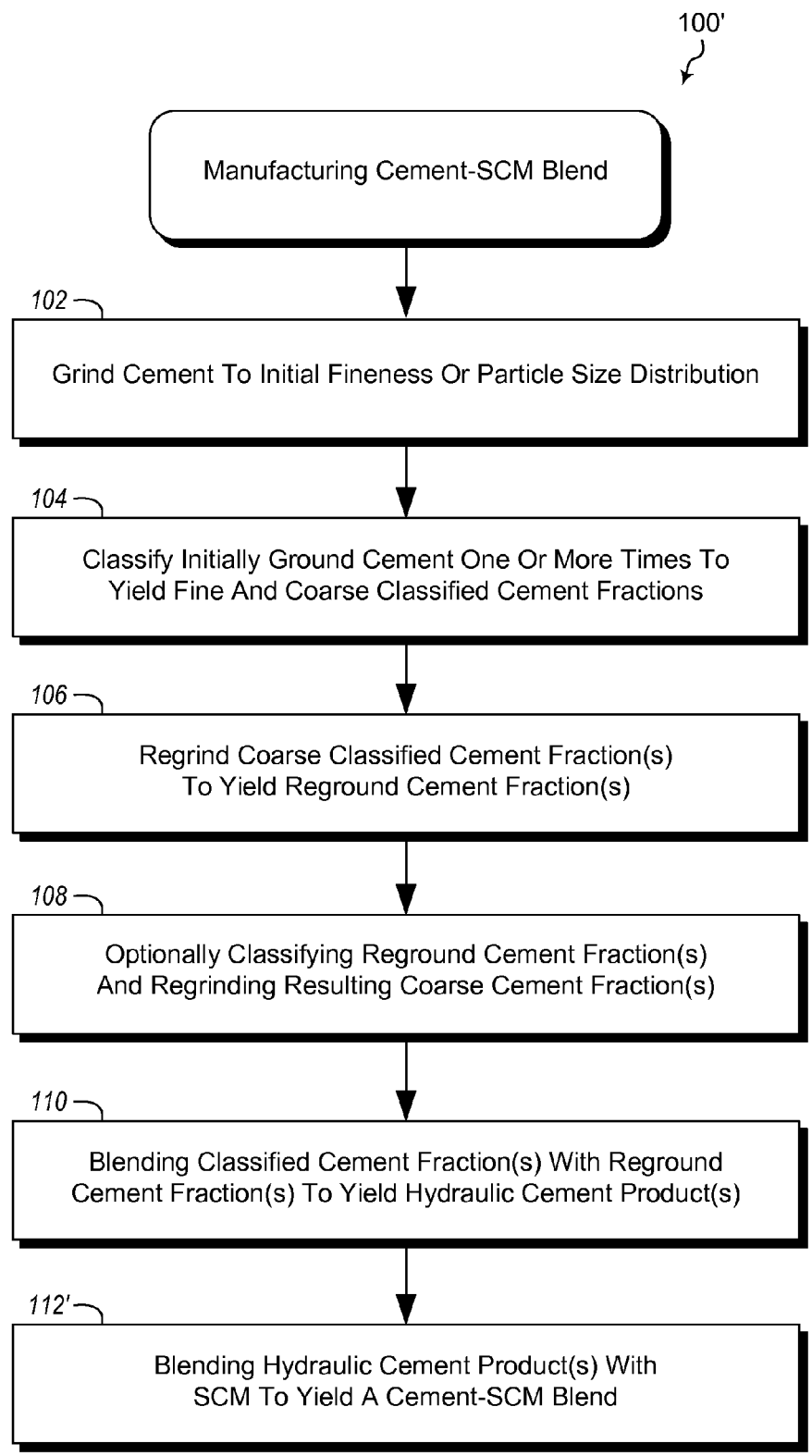
FIG. 1B is a schematic flow diagram of an example method of manufacturing cement-SCM blends.

Alternatively, as shown in FIG. 1B, particularly step 112', the dry hydraulic cement material can be blended in dry form with an SCM to form a dry cement-SCM blend that can be stored and/or shipped in dry form and used as desired.

Examples of useful manufacturing methods and apparatus that may be adapted for use in making hydraulic cements having a narrow particle size distribution within the scope of the invention are illustrated in FIGS. 2, 3A-3B, 4A-4C, 5A-5E and 6A-6E and also set forth in U.S. Pat. No. 7,799,128, U.S. Provisional Application No. 61/305,423, filed Feb. 17, 2010, and U.S. Provisional Application No. 61/324,741, filed Apr. 15, 2010, which are incorporated by reference and which describe useful manufacturing methods and apparatus that may be adapted for use in making cement-SCM blends described herein using the disclosed hydraulic cement compositions.

Figure 2:
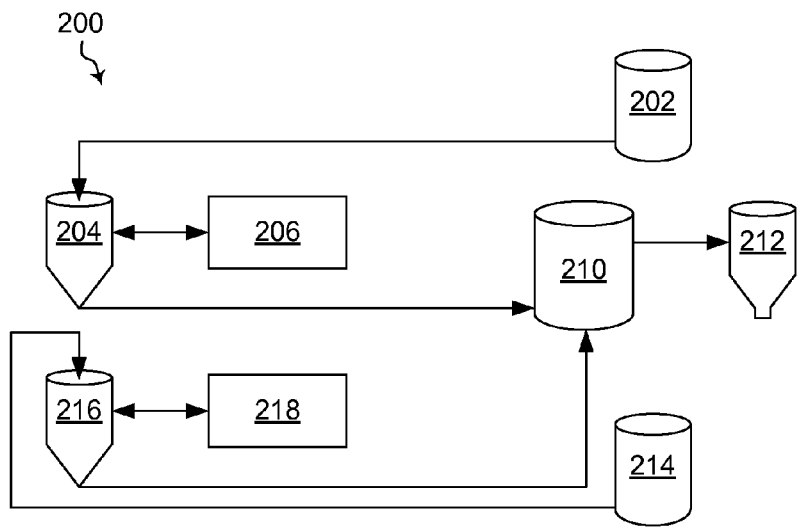
FIG. 2 schematically depicts an example classification and milling system for manufacturing cement-SCM blends.

FIG. 2 illustrates an example grinding, classification and blending system 200 for forming blended cement from streams of finer cement and coarser SCM. A SCM from silo 202 is processed by classifier 204 in order to remove the coarsest particles (e.g., above about 45-80 µm), which are ground in grinder 206 in a circuit indicated by the arrows between classifier 204 and grinder 206. The modified coarse SCM stream is delivered to mixer 210 to form blended cement. An initially ground hydraulic cement from silo 214 is processed by classifier 216 to remove coarse particles above a desired d90 (e.g., 10-20 µm), which are reground in grinder 218 in a circuit indicated by the arrows between classifier 216 and grinder 218. The modified fine hydraulic cement stream is delivered to mixer 210 for mixing with the modified coarse SCM to form blended cement. The blended cement product is stored in silo 212 and used to manufacture a cementitious product.

We note that it may be necessary to modify the apparatus and methods disclosed in U.S. Pat. No. 7,799,128 to yield hydraulic cement compositions having a higher d10 (e.g., such as by grinding more coarsely and/or classifying in a different way to reduce the amount of ultrafine cement particles that may otherwise be produced). To raise the d10 of the cement product it may be desirable to remove (e.g., dedust) some or all of the ultrafine particles below a certain particle size to produce a product having a desired PSD even if the grinding/classification apparatus are not capable of being modified or refined to yield cement having the desired d10. The removed cement fines can be reused in a variety of applications, such as grout, Type III cement, or other products in which ultrafine cement particles are desirable and valuable, or they can be used as a cement kiln feed material and recycled back into clinker.

In the case of ternary and quaternary blends that include both coarse and ultrafine SCM particles, methods and apparatus similar to those used to form the fine cement fraction can be adapted to form coarse and ultrafine SCM fractions. Accordingly, the apparatus and methods illustrated in and described relative to FIGS. 2, 3A-3B, 4A-4C, 5A-5E, and 6A-6E can be adapted to form coarse and ultrafine SCM fractions. In addition, apparatus shown in these figures are illustrative and not limiting. They do not foreclose adding another component, subtracting a component, reconfiguring a component, or reroute a particle stream among and between any components. Unless stated otherwise, similar components in a figure can operate in similar fashion as in another but may provide specialize functionality, whether explicit or implicit in the description, for a given configuration.

Figure 3A:
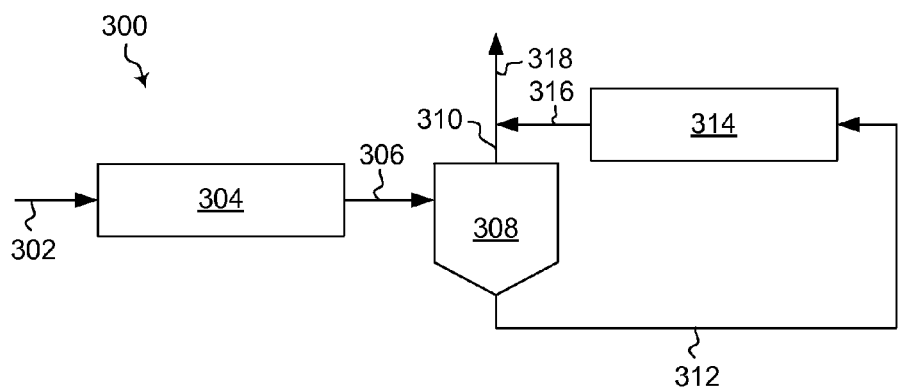
FIGS. 3A-3C schematically illustrate example one-separator milling and separation systems for manufacturing hydraulic cement having a desired PSD.
Figure 3B:
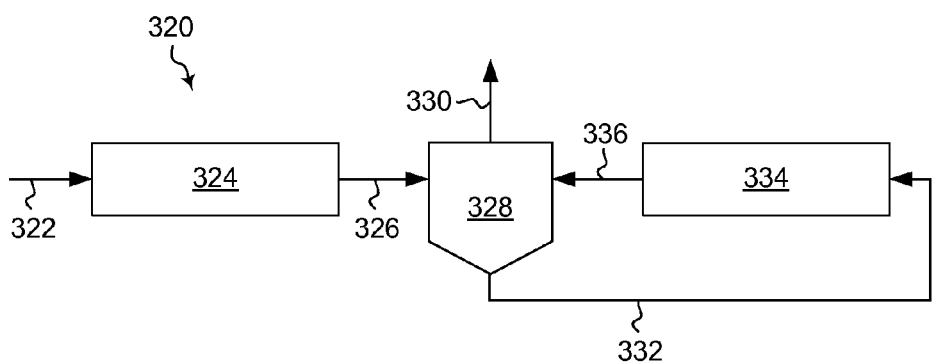
Figure 3C:
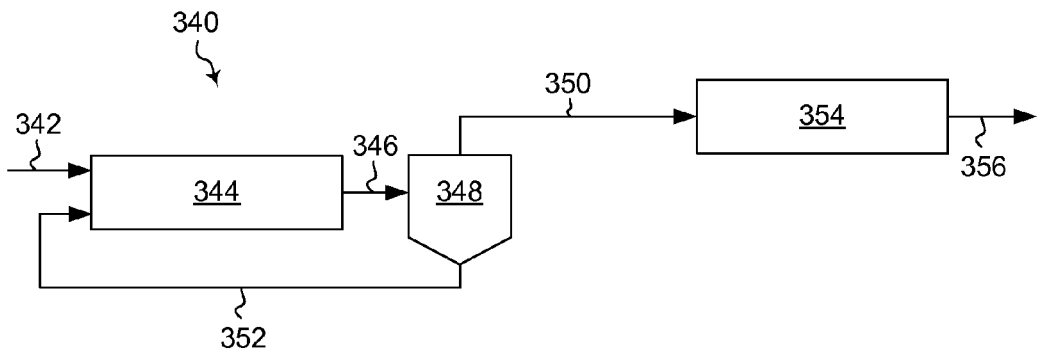

FIGS. 3A-3C illustrate one-separator milling and separation systems for producing cement having a narrow PSD. In system 300 of FIG. 3A, clinker stream 302 (nodules or partially ground) is milled in coarse mill 304 to produce a coarsely ground particle stream 306. Separator 308 (e.g., air classifier) receives particle stream 306 and separates it into fine classified stream 310 and coarse dedusted stream 312, which is reground in fine mill 314 to form fine reground stream 316. Fine streams 310 and 316 are combined using known methods to yield a hydraulic cement product 318 having a desired narrow PSD as described herein.

In system 320 of FIG. 3B, clinker stream 322 and coarse mill 324 produce ground particle stream 326, which is fed into air classifier 328 to produce a coarse dedusted stream 332. Coarse stream is reground in fine mill 334 to form fine reground stream 336, which is returned to classifier 328. Classifier 328 combines streams 326 and 336 and removes a hydraulic cement product 330 a desired narrow PSD from coarse dedusted stream 332. In this schemata, the air classifier 328 provides dual combining and classification functions, which eliminates the need for a separate apparatus to recombine ground and reground particle streams 326, 336.

System 340 of FIG. 3C includes coarse mill 344, which receives and grinds clinker stream 342 to form coarse ground stream 346, and air classifier 348, which, together with the coarse mill 344, forms a coarse milling circuit in which more coarse classified stream 342 is recycled to coarse mill 344. Less coarse classified stream 350 is reground in fine mill 354 (e.g., a jet mill with internal classifier or roll press) to form a hydraulic cement product 330 a desired narrow PSD. An advantage of a jet mill with internal classifier is that it can be adjusted to only regrind particles above a specified size in order to reduce the d90 and narrow the PSD. Newly developed roll presses can inexpensively regrind partially ground particles to reduce the d90 and narrow the PSD.

Figure 4A:
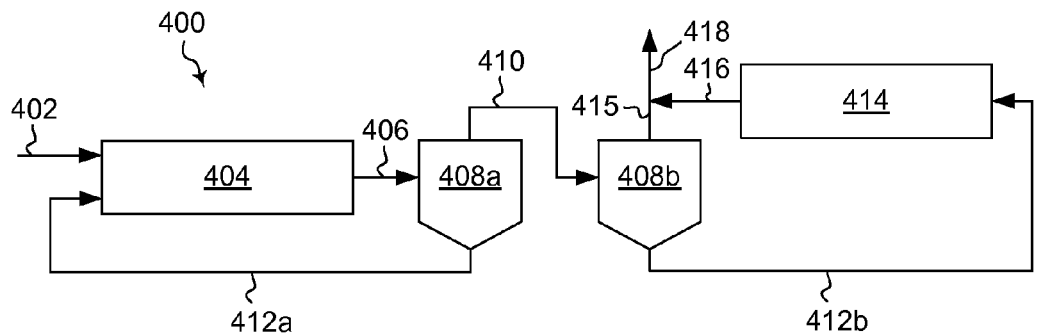
FIGS. 4A-4C schematically illustrate example two-separator milling and separation systems for manufacturing hydraulic cement having a desired PSD.
Figure 4B:
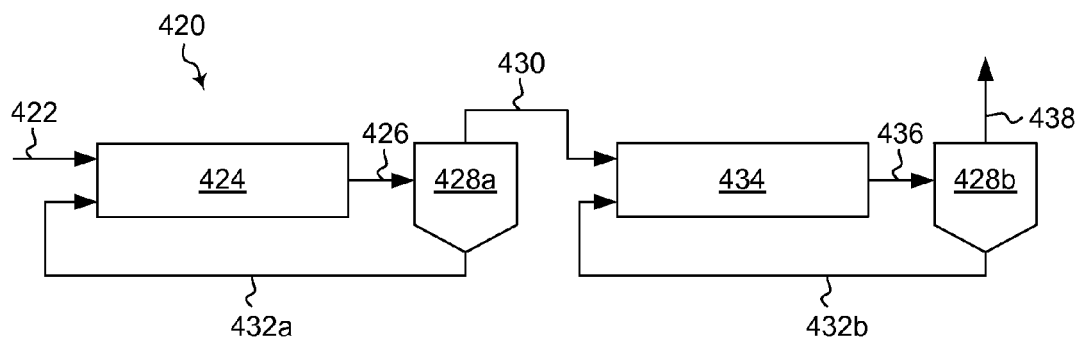
Figure 4C:
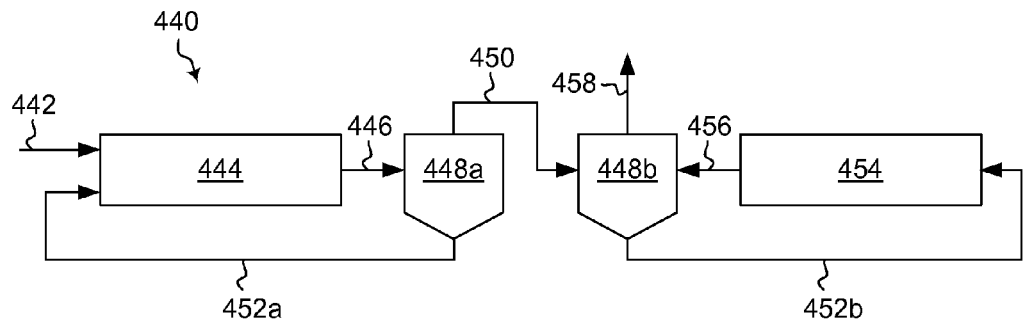

FIGS. 4A-4C illustrate two-separator milling systems for producing cement having a narrow PSD. Providing additional separators can increase grinding efficiency and/or increases the steepness of the PSD curve of the cement product (e.g. relative to the d10 and/or d90). They can also narrow the PSD by separating out fines and only regrinding a remaining dedusted coarse fraction. In one embodiment, a first separator can be a high throughput separator and a second separator can be a high efficiency separator.

System 400 of FIG. 4A processes clinker stream 402 in a coarse milling circuit involving coarse mill 404, ground particle stream 406, first separator 408a, and recycled coarse stream 412a to form intermediate particle stream 410. Second separator 408b (e.g., high efficiency air classifier) receives and processes stream 410 into fine reclassified stream 415 and coarse dedusted stream 412b, which is reground in fine mill 414 to form a fine reground stream 416, which is combined with fine reclassified stream 415 using known methods (e.g., mixing silo, not shown) to yield cement material 418 having a desired narrow PSD. Grinding efficiencies are increased by using dedicated coarse and fine grinding mills that more efficiently grind their respective feed materials and also dedicated coarse and fine classifiers 408a and 408b that separates at least a portion of finer particles from coarser particles before they are reground.

System 420 of FIG. 4B processes clinker stream 422, ground particle stream 426, and coarse stream 432 with coarse mill 404 and first separator 408a in a coarse milling circuit as above to form intermediate stream 430. Stream 430 is processed by fine mill 434 to produce fine reground stream 436. Second separator 428b (e.g., high efficiency air classifier) receives stream 436 and separates it into cement material 438 having a desired narrow PSD and coarse dedusted stream 432b, which is recycled back into fine mill 434 in a continuous fine milling circuit. Grinding efficiencies are increased by using dedicated coarse and fine milling circuits with dedicated mills and separators that more efficiently process their respective streams. Coarse milling circuit can be operated using existing methods to form a particle stream having a PSD corresponding to conventional cement or a coarser particle stream to increase throughput and decrease initial grinding cost. The fine milling circuit can be an add-on to an existing milling system at a cement plant.

System 440 of FIG. 4C produces intermediate stream 450 in a coarse milling circuit involving clinker stream 442, coarse mill 444, ground stream 446, first separator 448a, and coarse stream 452a. Particle stream 450 is formed into cement product 458 having a desired narrow PSD by a fine milling circuit involving second separator 448b, coarse dedusted stream 452b, fine mill 454, and fine reground stream 456. Separator 448b yields product 458 and also combines streams 450 and 456.

FIGS. 5A-5E illustrate three-separator milling systems for producing cement having a narrow PSD. Providing three separators further increases grinding efficiency and steepness of the PSD curve of the cement product through increased intermediate separation of fine and coarse particles between regrinding operations to ensure that coarse particle streams substantially free of fine particles are reground. By way of example, the first one or two separators can be high throughput separators and the last one or two separators can be high efficiency separators. The last one or two separators and fine mill can be added onto an existing milling system of a cement plant.

Figure 5A:
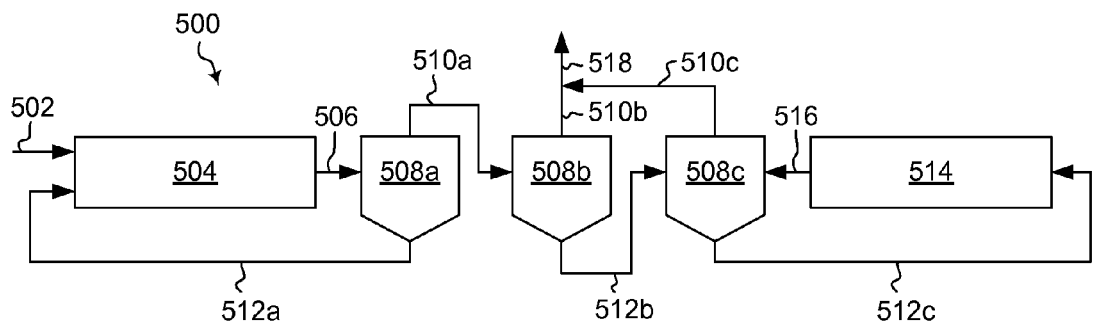
FIGS. 5A-5E schematically illustrate example three-separator milling and separation systems for manufacturing hydraulic cement having a desired PSD.

System 500 of FIG. 5A produces stream 510a in a coarse milling circuit involving clinker stream 502, coarse mill 504, ground stream 506, first separator 508a, and coarse stream 512a. Second separator 508b processes particle stream 510a into fine reclassified stream 510b and coarse dedusted stream 512b, which is reprocessed by a fine milling circuit involving third separator 508c, coarse stream 512c, fine mill 514, and fine reground stream 516. The fine milling circuit yields fine reground and reclassified stream 510c, which is combined with stream 510a using known methods to yield cement material 518 having a desired narrow PSD. In this embodiment, stream 510a is dedusted twice before being reground in fine mill 514, which minimizes production of ultrafine particles and narrows the spread between the d10 and d90.

Figure 5B:
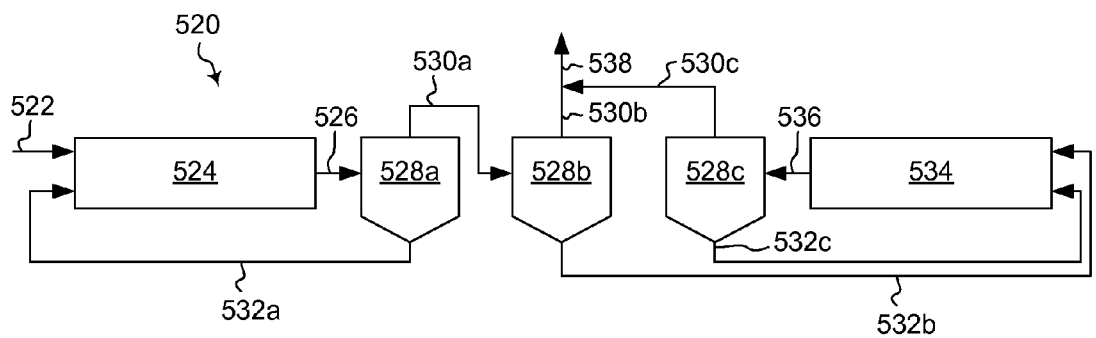

System 520 of FIG. 5B produces particle stream 530a in a coarse milling circuit involving clinker stream 522, coarse mill 524, ground stream 526, first separator 528a, and coarse stream 532a. Second separator 528b processes stream 530a to produce fine reclassified stream 530b and coarse dedusted stream 532b, which is fed into fine mill 534 to form reground fine stream 536. Third separator 528c receives and separates fine reground stream 536 into a fine reground and reclassified stream 530c, which is combined with fine reclassified stream 530b using known methods to yield a cement material 538 having a desired narrow PSD, and a coarse reground and dedusted stream 532c, which is recycled back into fine mill 534 in a fine grinding circuit.

Figure 5C:
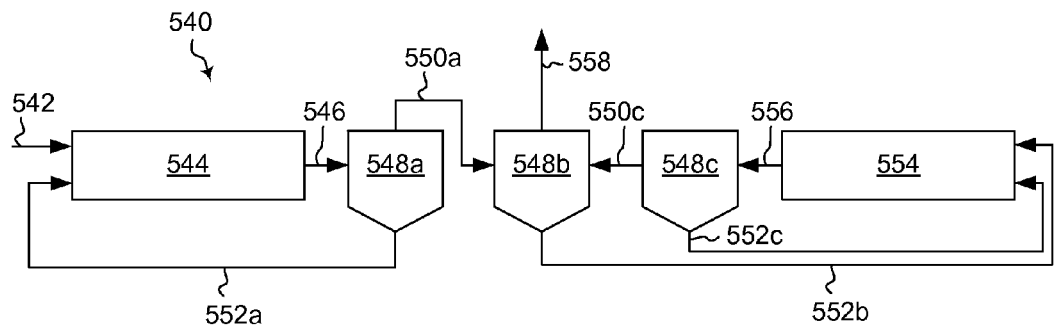

System 540 of FIG. 5C produces particle stream 550a in a coarse milling circuit involving clinker stream 542, coarse mill 544, ground stream 546, first separator 548a, and coarse stream 552a. Second separator 548b processes stream 550a to produce coarse dedusted stream 552b, which is processed into fine reground stream 550c by a fine milling circuit involving fine mill 554, fine reground stream 556, and third separator 548c. Fine reground stream 550c is returned to second separator 548b, which combines it with stream 550a and separates the combined streams to yield final cement material 558 having a desired narrow PSD and coarse dedusted stream 552b.

Figure 5D:
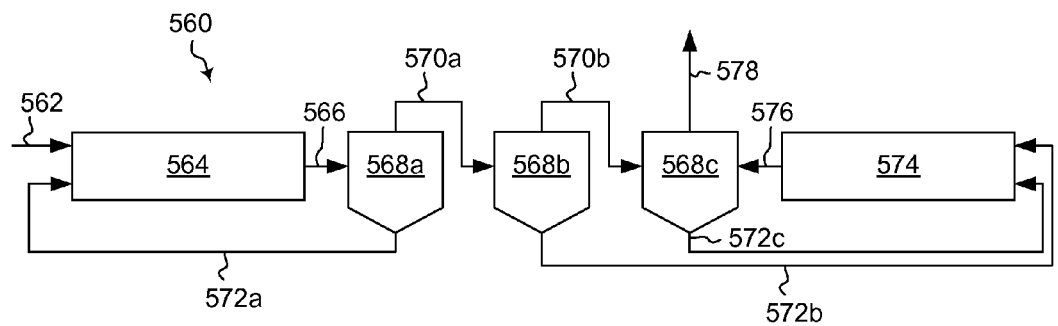

System 560 of FIG. 5D produces particle stream 570a in a coarse milling circuit involving clinker stream 562, coarse mill 564, ground stream 566, first separator 568a, and coarse stream 572a. Stream 570a is dedusted by second separator 568b to produce fine reclassified stream 570b and coarse dedusted stream 572b, which is reground by fine mill 574 to produce fine reground stream 576. Third separator 568c receives and combines fine reclassified stream 570b and fine reground stream 576 and separates the combined material to yield cement material 578 having a desired narrow PSD and coarse reground and dedusted stream 552c, which is returned to fine mill 574. Second and third separators 568b, 568c and fine mill 574 form a fine milling circuit. Intermediate stream 570a is dedusted twice before being reground.

Figure 5E:
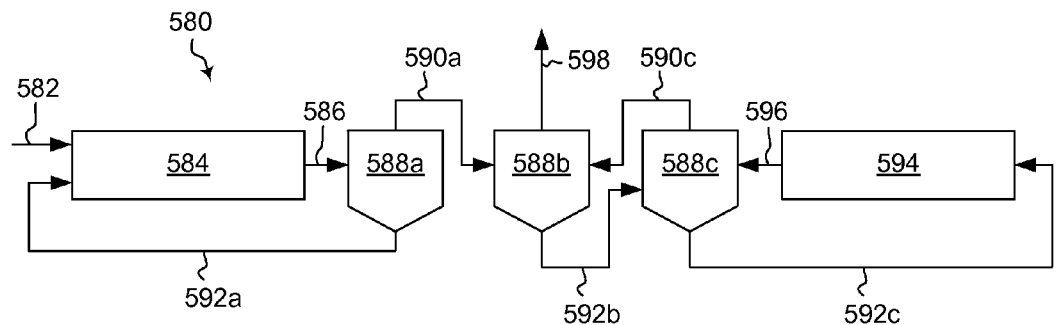

System 580 of FIG. 5E produces particle stream 590a in a coarse milling circuit involving clinker stream 582, coarse mill 584, ground stream 586, first separator 588a, and coarse stream 592a. Second separator 588b processes stream 590a into first coarse dedusted stream 592b, which is reprocessed into fine stream 590c by a fine grinding circuit involving third separator 588c, second coarse dedusted stream 592c, fine mill 594, and fine reground stream 596. Second separator 588b combines fine reground stream 590c and stream 590a and yields final cement material 598 having a desired narrow PSD and first coarse dedusted stream 552b. Intermediate stream 590a is dedusted twice before regrinding, and fine reground stream 596 is reclassified twice before contributing to cement product 598.

FIGS. 6A-6E illustrate four-separator milling systems for producing cement having a narrow PSD. Providing four separators can maximize grinding efficiency and steepness of the PSD curve of the cement product by maximizing separation of fine and coarse particles between regrinding operations to ensure that only coarse particle streams substantially free of fine particles are reground.

Figure 6A:
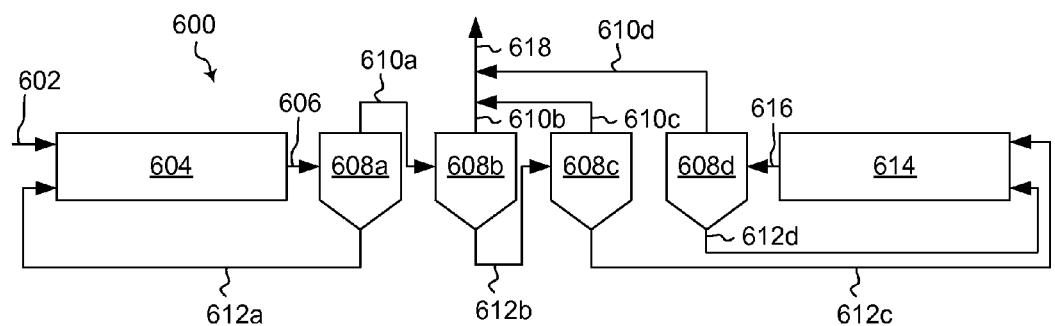
FIGS. 6A-6E schematically illustrate example four-separator milling and separation systems for manufacturing hydraulic cement having a desired PSD.

System 600 of FIG. 6A produces particle stream 610a in coarse milling circuit involving clinker stream 602, coarse mill 604, ground stream 606, first separator 608a, and coarse stream 612a. Second separator 608b produces first fine reclassified stream 610b and first coarse dedusted stream 612b from stream 610a, and third separator 608c processes first coarse dedusted stream 612b into second fine reclassified stream 610c and second coarse dedusted stream 612c. Stream 612c is reprocessed into fine stream 612d by a fine milling circuit involving fourth separator 608d, course reground and dedusted stream 612d, and fine mill 614. Streams 610a, 610c and 610d are combined using known methods to yield cement 618 having a desired narrow PSD.

Figure 6B:
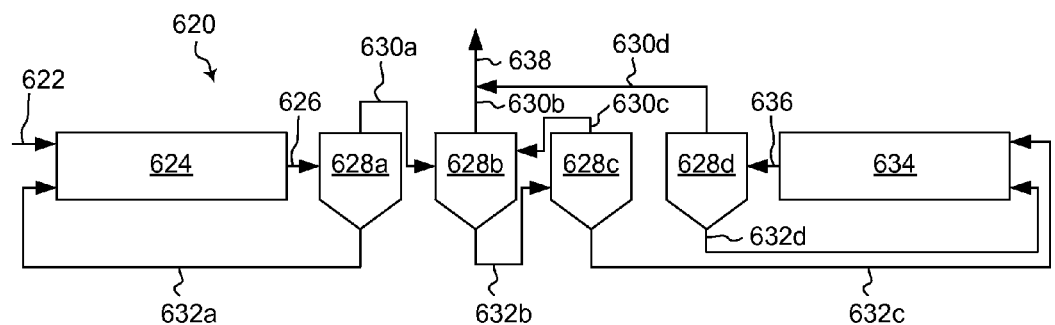

System 620 of FIG. 6B processes clinker stream 622 in a coarse milling circuit involving coarse mill 624, ground stream 626, first separator 628a, and coarse stream 632a to yield first stream 630a. Stream 630a is processed by second separator 628b to form first dedusted stream 632b, which is processed by third separator 608c to yield second coarse dedusted stream 632c and reclassified stream 630c, which is returned to second separator 628b. Second separator 628b combines reclassified stream 630c and first stream 630a to yield first fine reprocessed stream 630b. Second coarse dedusted stream 632c is reprocessed into second reprocessed stream 630d by a fine milling circuit involving fine mill 634, fine reground stream 636, fourth separator 628d, and courser reground and dedusted stream 632d. First and second fine reprocessed streams 630b and 630d are combined using known methods to yield cement material 638 having a desired narrow PSD.

Figure 6C:
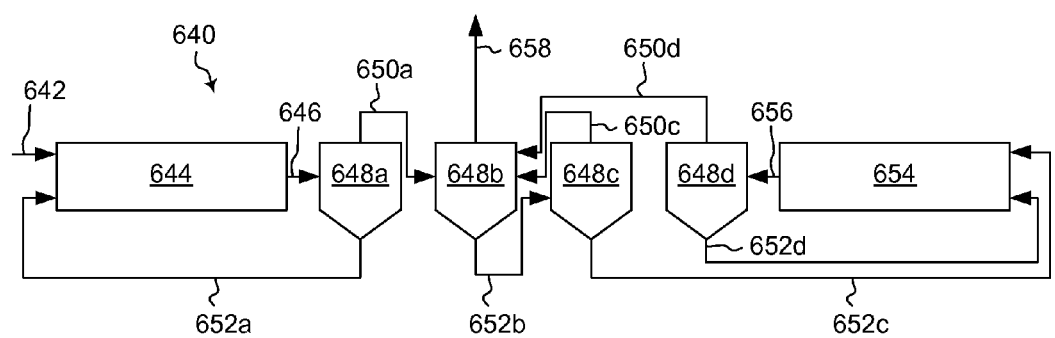

System 640 of FIG. 6C is similar to system 620 except that reprocessed stream 650d is returned to second classifier 648b and combined with streams 650a and 650c to form cement material 658 having a desired narrow PSD. This eliminates the need for a separate mixing apparatus to form the final cement product.

Figure 6D:
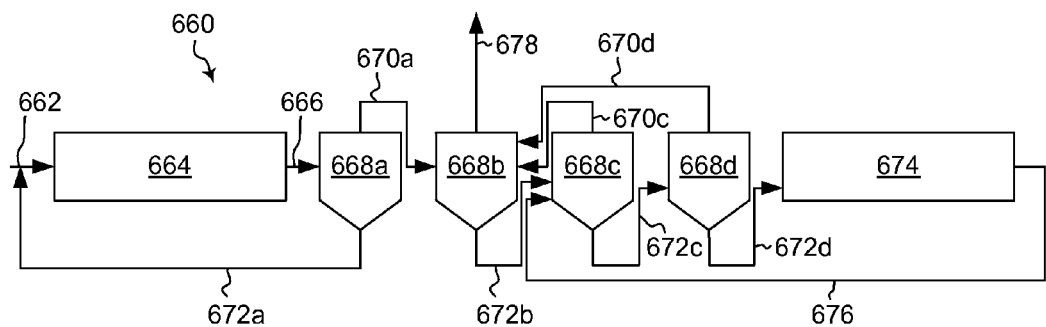

System 660 of FIG. 6D is similar to system 640 except that only coarse dedusted stream 672d from fourth separator 668d is reprocessed by fine mill 674, and coarse dedusted stream 672c from third separator 668c is fed into fourth separator 668d rather than being reprocessed by fine mill 674. In this embodiment, intermediate stream 670a is dedusted three times by second, third and fourth separators 668b, 668c, 668d before being reground in fine mill 674, and reprocessed stream 676 is reclassified three times by second, third and fourth separators 668b, 668c, 668d before contributing to cement product 678.

Figure 6E:
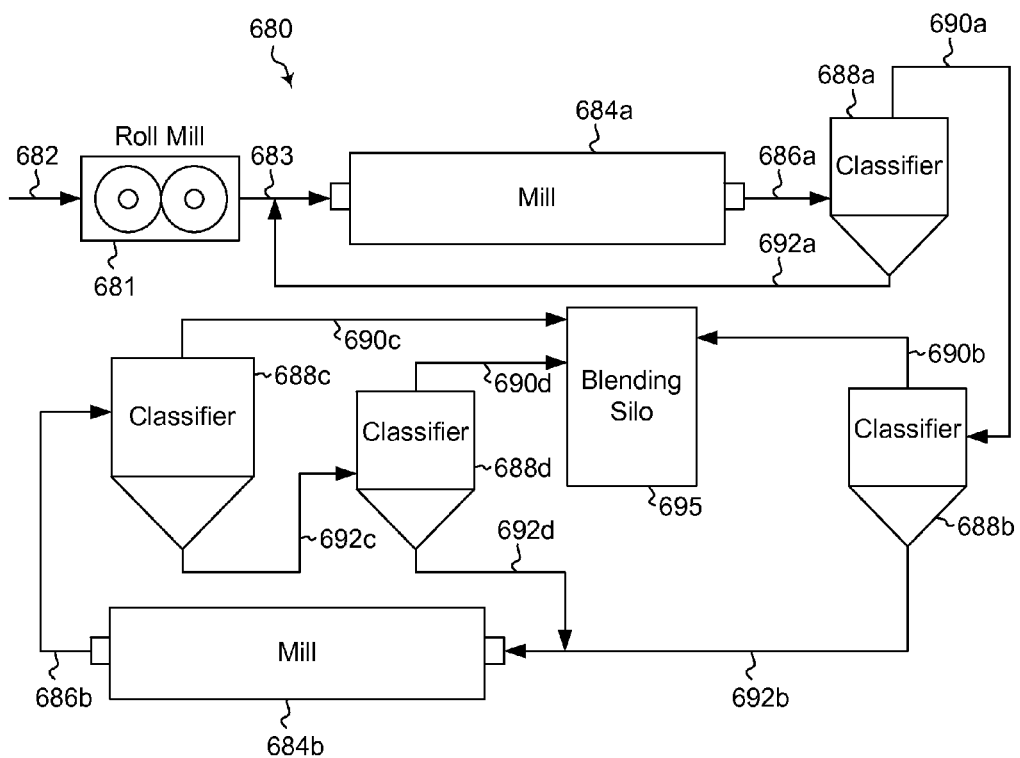

System 680 of FIG. 6E initially grinds clinker stream 662 in roll mill 681 to produce ground stream 683, which is processed into first milled stream 690a by a first milling circuit involving first mill 684a, first milled particle stream 686a, first classifier 688a, and first coarse dedusted stream 692a. First milled stream 690a is processed by second classifier 688b to produce first finished stream 690b. Coarse stream 692b from second classifier 688b is reprocessed by a second milling circuit involving second mill 684b, second milled particle stream 686c, third classifier 688c, coarse stream 692c, fourth classifier 688d, and coarse stream 692d. Second finished stream 690c and third finished stream 690d are combined with first finished stream 690b in blending silo 695 for form a cement product having a desired narrow PSD. First and second milled streams 686a, 686b are dedusted twice before being reprocessed by second mill 684b.

V. Cementitious Compositions

Narrow PSD cements can be used to make cement-SCM blends, concrete, mortar, grout, molding compositions, and other cementitious compositions. "Concrete" typically includes a cement binder and aggregate, such as fine and coarse aggregates. "Mortar" typically includes cement, sand, and lime. "Oil well cement" is blended and pumped into a well bore in a continuous process and must be capable of being pumped through relatively narrow injection tubes and spaces between a well bore and casing. "Grout" is used to fill in spaces such as cracks or crevices in concrete structures, spaces between structural objects, and spaces between tiles. "Molding compositions" are used to mold or cast objects, such as pots, posts, fountains, ornamental stone, and the like.

Cementitious compositions may include hydraulic cement (e.g., Portland cement), SCMs (e.g., fly ash, slag, natural pozzolan, or limestone), water, and aggregate (e.g., sand and/or rock), and admixtures, such as accelerating agents, retarding agents, plasticizers, water reducers, water binders, and the like, and fillers.

Cement-SCM blends and other cementitious compositions can be dry blended prior to adding water, or they may be prepared in situ within a freshly mixed cementitious composition that includes water. Cement-SCM blends can benefit the environment by reducing the carbon footprint of concrete, mortar, oil well cement and other cementitious compositions. They can also encapsulate and sequester metals and other potentially hazardous materials found in some SCMs VI. Examples The following examples illustrate embodiments of the invention that have actually been prepared or which were derived from actual mix designs. Examples in the past tense involve the manufacture and use of narrow PSD hydraulic cements according to the invention and cement-SCM blends that use such hydraulic cements. Examples in the present tense are hypothetical in nature but illustrative of embodiments within the scope of the invention.

Examples 1-20

Examples 1-20 describe the strength results of mortar cube testing performed by the National Institute of Standards and Technology (NIST) according to ASTM C-109, but modified so that the w/c ratio of the 100% control cement mix was 0.35. The same volume of water used in the control mix was used in the blended cement mixes, sometimes with a high range water reducer (HRWR) to maintain flow.

Comparative Examples 1 and 2 employed a commercially available Type I/II (ASTM C-150) cement to provide a reference control. Comparative Example 2 also employed a commercially available Class F fly ash (ASTM C-618) without modification to provide a reference control blend. According to its manufacturer, the cement had a Blaine fineness of 376 m$^2$/kg and a potential Bogue phase composition of 57% $C_3S$, 15% $C_2S$, 7% $C_3A$, and 10% $C_4AF$ by mass. Its measured density was 3200 kg/m$^3$±10 kg/m$^3$ (ASTM C-188). According to its manufacturer, the Class F fly ash contained major oxides of 52.9% $SiO_2$, 26.4% $Al_2O_3$, 8.5% $Fe_2O_3$, and 2.1% CaO by mass, with measured strength activity indices (ASTM C-311/ASTM C-618) of 88% and 92% at 7 days and 28 days, respectively. Its density was reported as 2300 kg/m$^3$ by the manufacturer. Examples 3-19 employed narrow PSD cements obtained by modifying the Type I/II cement used in Examples 1 and 2, as described below. Examples 3-18 employed coarse Class F fly ashes obtained by modifying the fly ash used in Example 2, as described below. Example 19 employed a commercially available Class C fly ash without modification. Comparative Example 20 employed one of the coarse fly ashes and a commercially available Type III cement with a density of 3250 kg/m$^3$ and a Blaine fineness of 613 m$^2$/kg to provide another control reference.

Three variables were selected as candidates for influencing the optimization of properties of cement/fly ash blends: cement PSD, fly ash PSD, and fly ash volumetric proportion percentage. Via classification of the Type I/II cement into fine and coarse fractions and regrinding the coarse fractions, four narrow PSD cements with target d90 values of 7.5 µm, 10 µm, 15 µm, and 20 µm were obtained from the RSG test facility in Sylacauga, Ala. RSG classifier model ACS-005 was used to initially produce fine fractions having a target d90 and courrse fractions. The course fractions were reground using RSG grinder model ufg-15 using 6 mm chrome steel grinding media to produce a reground fraction having a d90 similar to the target d90. RSG employed a MICRTRAC PSD analyzer to determine the PSDs of the fine and reground materials during processing.

The four narrow PSD Portland cements used in Examples 3-19 were made by recombining at NIST each of the four fine classified fractions with its corresponding reground fraction. The recombined narrow PSD cements were designated as cements 7 through 10, respectively. The d90 values of the four narrow PSD cements were independently measured at NIST using a Malvern laser diffraction particle size analyzer and isopropyl alcohol as solvent and were nominally 9 μm (cement 10), 11 μm (cement 9), 12 μm (cement 8), and 24 μm (cement 7). The d90 the original cement (designated as cement 6) was determined by NIST to be 36 μm.

The four modified Class F fly ashes used in Examples 3-18 and 20 had target d10 values of 5 μm, 10 μm, 15 μm, and 20 μm and were designated as fly ashes (FA) 2 through 5, respectively. They were prepared by classifying at RSG the control class F fly ash in two steps using RSG classifier model ACS-005. In a preliminary step, the entirety of the fly ash was pre-classified to remove substantially all of the coarse particles above about 60 μm. Thereafter, four different samples of the pre-classified fly ash were dedusted to remove fines four different ways to yield modified fly ashes having a target d10. As determined at RSG using a MICRTRAC PSD analyzer, fly ash 2 had a d10 of 5.6 μm; fly ash 3 had a d10 of 10.1 μm; fly ash 4 had a d10 of 15.2 μm; and fly ash 5 had a d10 of 19.3 μm. The unclassified and non dedusted class F ash in unaltered form (designated as fly ash 1) had a d10 of 4.227 μm. The d10 values for the four modified fly ashes were independently measured at NIST using a Malvern laser diffraction particle size analyzer and isopropyl alcohol as solvent and were nominally 4 μm (FA 2), 11 μm (FA 3), 13 μm (FA 4), and 15 μm (FA 5) in comparison to 2.7 μm for the original fly ash (FA 1). One purpose of dedusting was to provide four different PSD fly ashes that could be blended with the four narrow PSD Portland cements in an attempt to yield cement-pozzolan blends having an overall fineness and PSD that approximated the fineness and PSD of OPC. It was hypothesized that approximating the fineness and PSD of OPC might yield a cement-pozzolan blend having similar water demand as OPC. Another purpose was to determine if and how the use of dedusted fly ash might affect strength development when blended with narrow PSD cements.

The four levels for the fly ash volume percentages were set at 20%, 35%, 50%, and 65%. Since three variables with four levels implies 64 runs for a complete factorial experiment, the number of experimental runs was reduced to 16 by NIST by applying design of experiment principles to create a fractional factorial experimental design. In addition to these sixteen mortar mixtures (Examples 3-18), four additional mixtures were investigated: 1) a control mixture produced with the original cement (cement 6) (two replicates prepared) (Examples 1A and 1B), 2) a 50:50 volumetric blend of the original cement and original fly ash (FA1) as a reference point for the performance of an existing HVFA blend (Example 2), 3) a mixture containing 35% of an unprocessed (no grinding or subsequent classification) Class C fly ash with 65% of the cement 9 with a d90 of 11 μm to investigate the influence of fly ash class on early and later age performance and water demand (Example 19), and 4) a mixture with a Type III cement and 35% of the 4 μm Class F fly ash to provide a reference point (Example 20).

The d10, d50 and d90 of cements 6-10, as determined by NIST, and also their derived ratios d90/10, d50/d10 and d90/d50, are set forth below in Table 1. Also included for comparison purposes are the d10, d50 and d90 (as provided by NIST) and their corresponding ratios d90/10, d50/d10 and d90/d50 for three commercially available Portland cements made by Lehigh (i.e., a coarse Type I/II, a fine Type II/V, and a very fine Type III) and a less fine Type III Portland made by Mitsubishi.

TABLE 1

| Cement | d10 | d50 | d90 | d90/d10 | d50/d10 | d90/d50 |
|---|---|---|---|---|---|---|
| 6 | 1.551 | 11.844 | 36.495 | 23.53 | 7.64 | 3.08 |
| 7 | 1.091 | 6.524 | 24.277 | 22.25 | 5.98 | 3.72 |
| 8 | 0.768 | 3.555 | 12.113 | 15.77 | 4.62 | 3.41 |
| 9 | 0.751 | 3.271 | 10.81 | 14.39 | 4.36 | 3.30 |
| 10 | 0.685 | 3.055 | 8.621 | 12.59 | 4.46 | 2.82 |
| Type I/II | 1.85 | 17.78 | 49.868 | 26.96 | 9.61 | 2.80 |
| Type II/V | 1.245 | 11.237 | 32.912 | 26.44 | 9.02 | 2.93 |
| Type III | 0.975 | 6.768 | 17.441 | 17.89 | 6.94 | 2.58 |
| Type III | 1.16 | 8.782 | 24.69 | 21.28 | 7.57 | 2.81 |

The types and volumetric percentages of cement and fly ash used in Examples 1-20 are set forth in Table 2 below. Replacement of cement with fly ash was performed on a volumetric basic to account for differences in the specific gravities of cement and fly ash. In some cases a high range water reducer (HRWR) was added to maintain adequate flow without changing the volume of added water. The amounts of HRWR, if any, are set forth in Table 2 and expressed in terms of weight percent of total binder (e.g., 1% means 1 lb. per 100 lbs. of total binder). The 1-day, 3-day, 7-day, 28-day, 91-day, and 182-day compressive strengths (MPa and psi) of mortar cubes measured according to ASTM C-109 by NIST for Examples 1-20 are also set forth in Table 2.

TABLE 2

| Example | Mix (%) | HRWR oz/100 oz cem | 1-day (MPa) (psi) | 3-day | 7-day | 28-day | 91-day | 182-day |
|---|---|---|---|---|---|---|---|---|
| 1 | C6 100 | 0.0 | 36.7 | 54.4 | 63.6 | 80.3 | 84.7 | 86.0 |
|   |   |   | 5320 | 7900 | 9220 | 11640 | 12280 | 12470 |
| 1 repeat | C6 100 | 0.0 | 36.3 | 55.1 | 62.7 | 79.4 | 87.9 | 92.6 |
|   |   |   | 5260 | 7990 | 9090 | 11510 | 12750 | 13430 |
| 2 | C6 50 F1 50 | 0.0 | 13.6 | 21.3 | 29.3 | 49.1 | 70.6 | 79.5 |
|   |   |   | 1980 | 3090 | 4250 | 7120 | 10240 | 11520 |
| 3 | C7 65 F4 35 | 0.0 | 27.4 | 39.7 | 51.8 | 69.7 | 79.2 | 90.9 |
|   |   |   | 3980 | 5780 | 7380 | 10100 | 11480 | 13170 |
| 4 | C7 50 F5 50 | 0.0 | 15.9 | 24.8 | 31.7 | 46.8 | 58.7 | 66.3 |
|   |   |   | 2300 | 3600 | 4780 | 6790 | 8520 | 9620 |
| 5 | C8 65 F5 35 | 0.367 | 37.9 | 48.0 | 59.3 | 65.6 | 77.1 | 81.8 |
|   |   |   | 5500 | 6960 | 8600 | 9510 | 11180 | 11860 |
| 6 | C9 50 F3 50 | 0.283 | 22.7 | 31.8 | 38.3 | 47.0 | 56.2 | 65.1 |
|   |   |   | 3300 | 4620 | 5550 | 6820 | 8160 | 9450 |
| 7 | C10 35 F5 65 | 0.0 | 11.7 | 15.9 | 19.2 | 26.0 | 33.0 | 41.8 |
|   |   |   | 1700 | 2310 | 2780 | 3770 | 4790 | 6060 |

TABLE 2-continued

| Example | Mix (%) | HRWR oz/100 oz cem | 1-day (MPa) (psi) | 3-day | 7-day | 28-day | 91-day | 182-day |
|---|---|---|---|---|---|---|---|---|
| 8 | C9 65 | 0.483 | 39.0 | 50.9 | 58.3 | 70.0 | 82.9 | 88.9 |
|   | F2 35 |       | 5660 | 7380 | 8460 | 10150 | 12030 | 12890 |
| 9 | C10 80 | 1.00 | 66.1 | 76.3 | 85.9 | 102 | 107 | 105 |
|   | F2 20 |      | 9590 | 11070 | 12460 | 14740 | 15510 | 15250 |
| 10 | C10 65 | 0.667 | 44.6 | 53.4 | 64.8 | 72.4 | 80.6 | 83.3 |
|    | F3 35 |       | 6460 | 7750 | 9400 | 10500 | 11690 | 12080 |
| 11 | C8 35 | 0.0 | 10.2 | 14.7 | 18.8 | 27.3 | 38.1 | 49.4 |
|    | F3 65 |     | 1480 | 2130 | 2720 | 3960 | 5530 | 7160 |
| 12 | C10 50 | 0.05 | 25.2 | 33.7 | 40.7 | 49.4 | 57.6 | 63.3 |
|    | F4 50 |      | 3650 | 4880 | 5910 | 7170 | 8360 | 9190 |
| 13 | C7 80 | 0.05 | 36.7 | 50.8 | 63.5 | 78.1 | 89.8 | 91.8 |
|    | F3 20 |      | 5320 | 7360 | 9220 | 11330 | 13020 | 13310 |
| 14 | C8 80 | 0.80 | 53.6 | 68.5 | 80.1 | 89.7 | 93.9 | 99.6 |
|    | F4 20 |      | 7770 | 9940 | 11620 | 13010 | 13620 | 14440 |
| 15 | C7 35 | 0.0 | 8.4 | 14.6 | 18.3 | 30.5 | 47.7 | 57.0 |
|    | F2 65 |     | 1210 | 2110 | 2660 | 4430 | 6910 | 8270 |
| 16 | C8 50 | 0.05 | 22.3 | 32.1 | 40.1 | 51.6 | 64.9 | 71.6 |
|    | F2 50 |      | 3240 | 4660 | 5810 | 7480 | 9410 | 10390 |
| 17 | C9 80 | 1.00 | 54.5 | 66.7 | 78.4 | 92.9 | 94.3 | 96.2 |
|    | F5 20 |      | 7910 | 9680 | 11370 | 13470 | 13680 | 13960 |
| 18 | C9 35 | 0.0 | 10.2 | 14.8 | 19.1 | 25.7 | 35.7 | 46.2 |
|    | F4 65 |     | 1480 | 2150 | 2770 | 3730 | 5180 | 6710 |
| 19 | C9 65 | 0.667 | 38.8 | 51.4 | 61.4 | 79.6 | 85.9 | 90.9 |
|    | F11 35 |      | 5620 | 7460 | 8910 | 11540 | 12450 | 13180 |
| 20 | C-III 65 | 0.480 | 31.8 | 45.6 | 49.6 | 66.3 | 77.6 | 84.2 |
|    | F2 35 |       | 4611 | 6620 | 7197 | 9620 | 11260 | 12207 |

Comparative 1-28 day strengths of mortar compositions made using cements 7 through 10 compared to mortar made using the 100% control cement were plotted and are graphically illustrated in FIGS. 7A-7F.

Figure 7A:
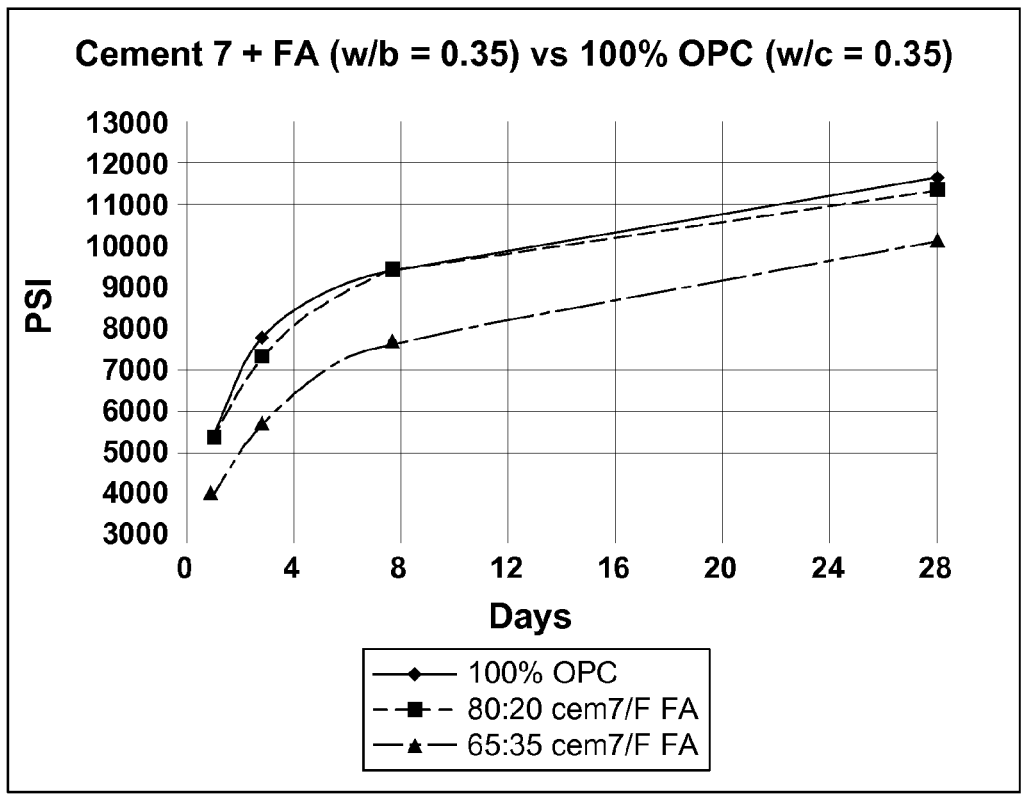
FIGS. 7A-7F are graphs comparing compressive strengths of various cement-fly ash blends with control 100% Portland cement.

FIG. 7A is a chart comparing the 1-28 day strengths of 80:20 and 65:35 cement-fly ash blends made using cement 7 (Examples 3 and 13) with the 1-28 day strength of the 100% control cement (Example 1).

Figure 7B:
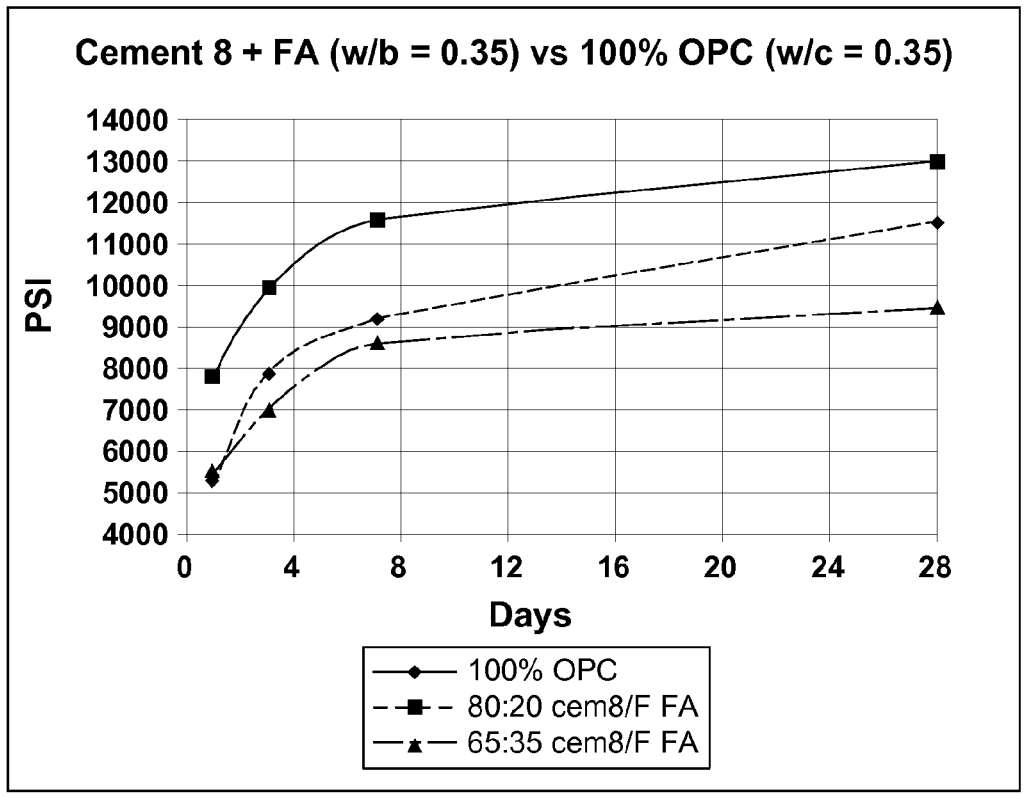

FIG. 7B is a chart comparing the 1-28 day strengths of 80:20 and 65:35 cement-fly ash blends made using cement 8 (Examples 5 and 14) with the 1-28 day strength of the 100% control cement (Example 1).

Figure 7C:
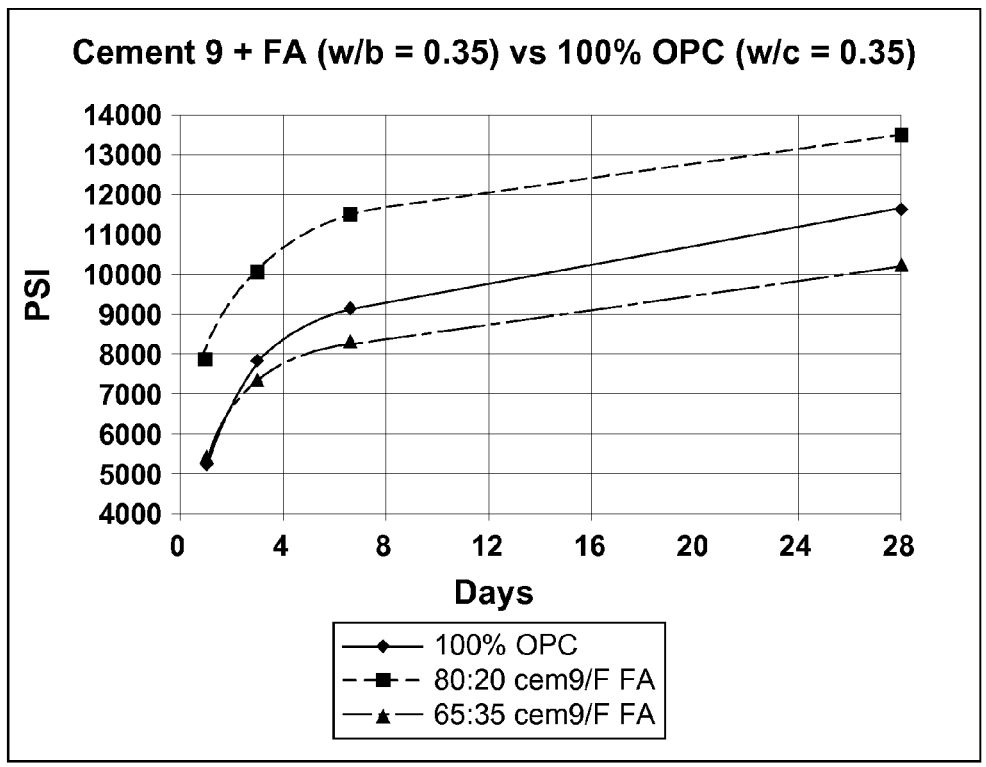

FIG. 7C is a chart comparing the 1-28 day strengths of 80:20 and 65:35 cement-fly ash blends made using cement 9 (Examples 8 and 17) with the 1-28 day strength of the 100% control cement (Example 1).

Figure 7D:
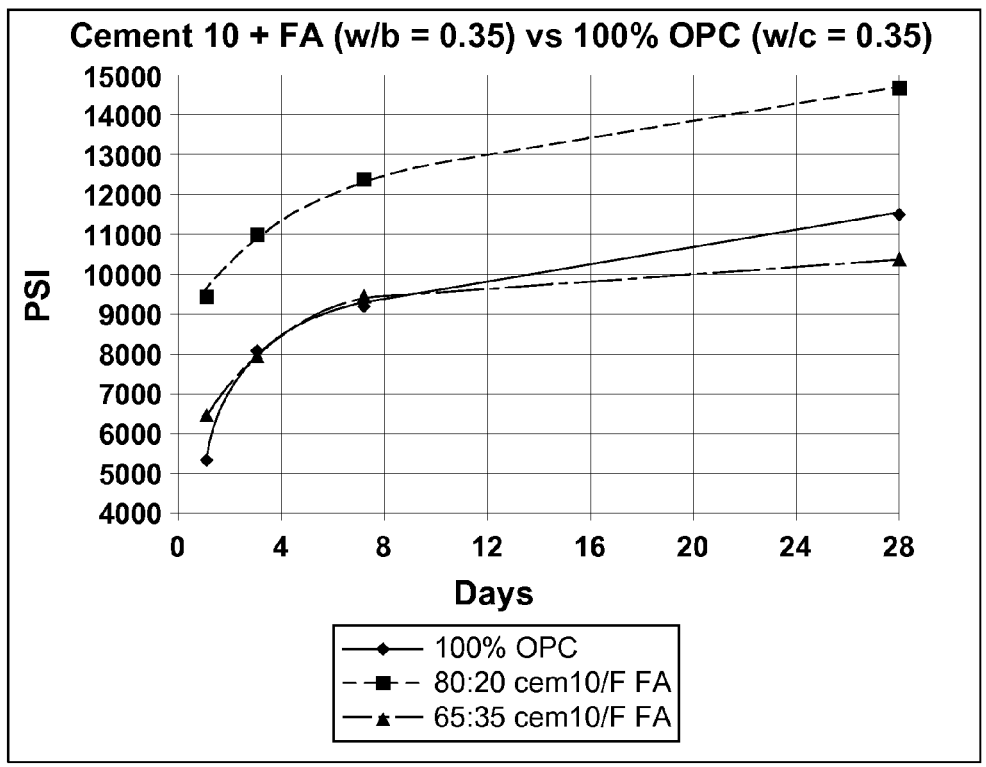

FIG. 7D is a chart comparing the 1-28 day strengths of 80:20 and 65:35 cement-fly ash blends made using cement 10 (Examples 9 and 10) with the 1-28 day strength of the 100% control cement (Example 1).

Figure 7E:
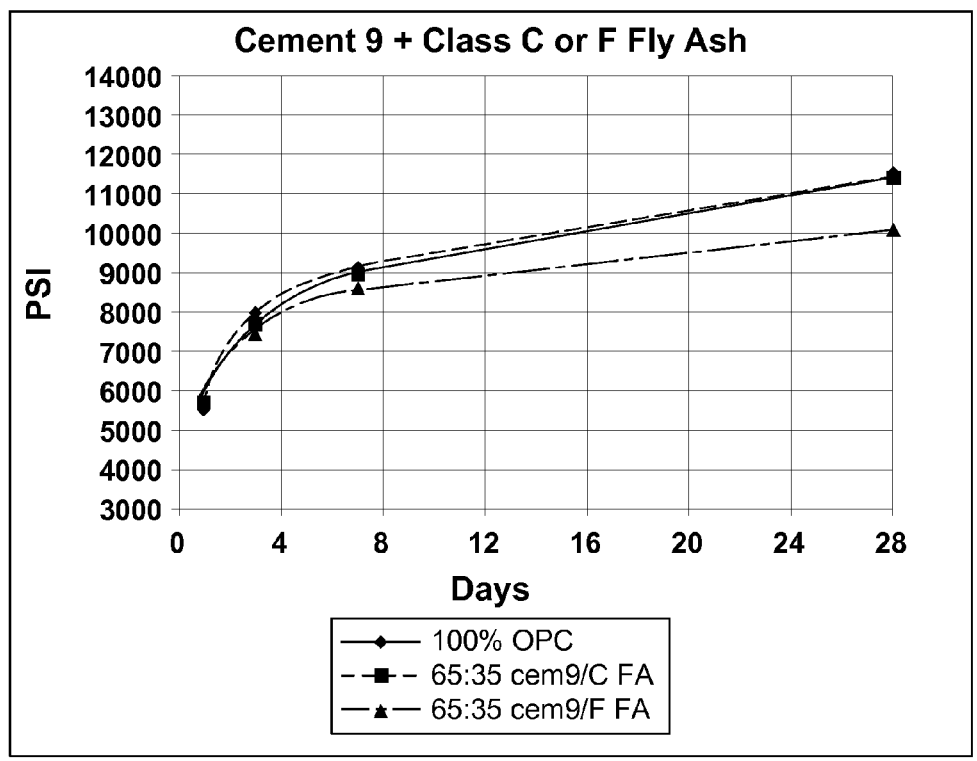

FIG. 7E is a chart comparing the 1-28 day strength of a 65:35 cement-fly ash blend made using cement 9 and class C fly ash (Example 19) with the 1-28 day strengths of the 100% control cement (Example 1) and the 65:35 cement-fly ash blend of Example 8.

Figure 7F:
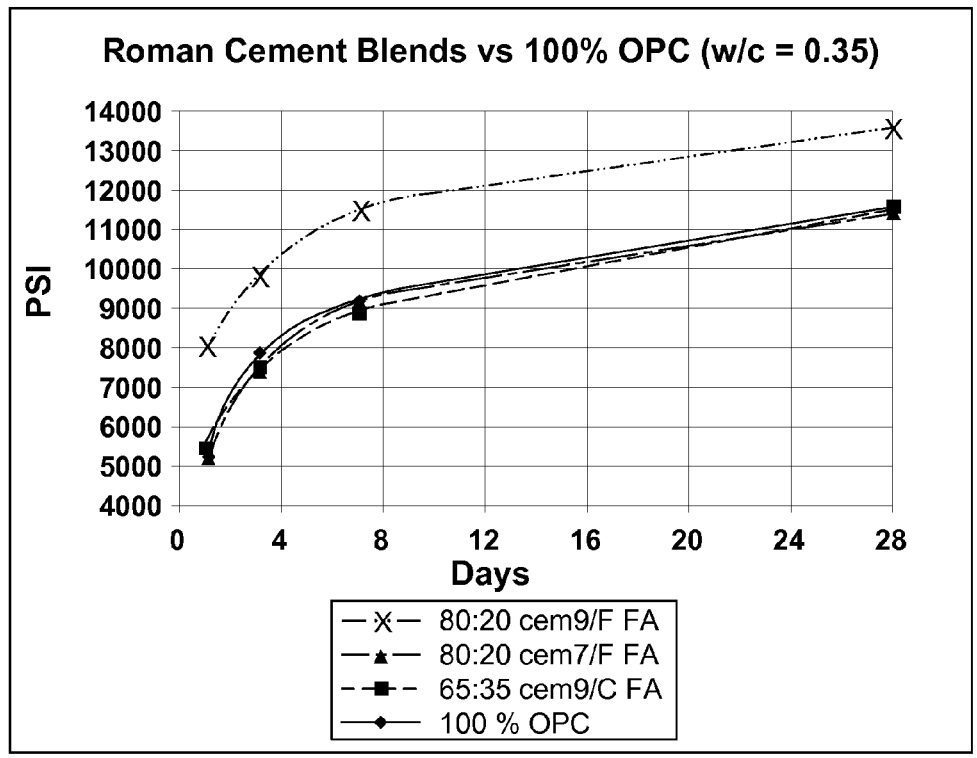

FIG. 7F is a chart comparing the 1-28 day strength of the 80:20 cement-fly ash blend made using cement 7 (Example 3), the 65:35 cement-fly ash blend made using cement 9 and class C fly ash (Example 19), and the 100% control cement (Example 1). The 80:20 and 65:35 blends of Examples 3 and 19 have strength development curves that essentially match the strength development curve of the 100% control cement (Example 1). They demonstrate that cement-pozzolan blends made using narrow PSD cements can be substituted for 100% cement (w/c=0.35) at different substitution levels and with no significant change in strength development across 1-28 days. The cement-fly ash blends of Examples 3 and 19 are therefore "plug and play" relative to the 100% control cement at w/c=0.35 and demonstrate that cement-pozzolan blends made using narrow PSD cements as disclosed herein can theoretically be used as general purpose cement in place of 100% OPC.

Figure 7G:
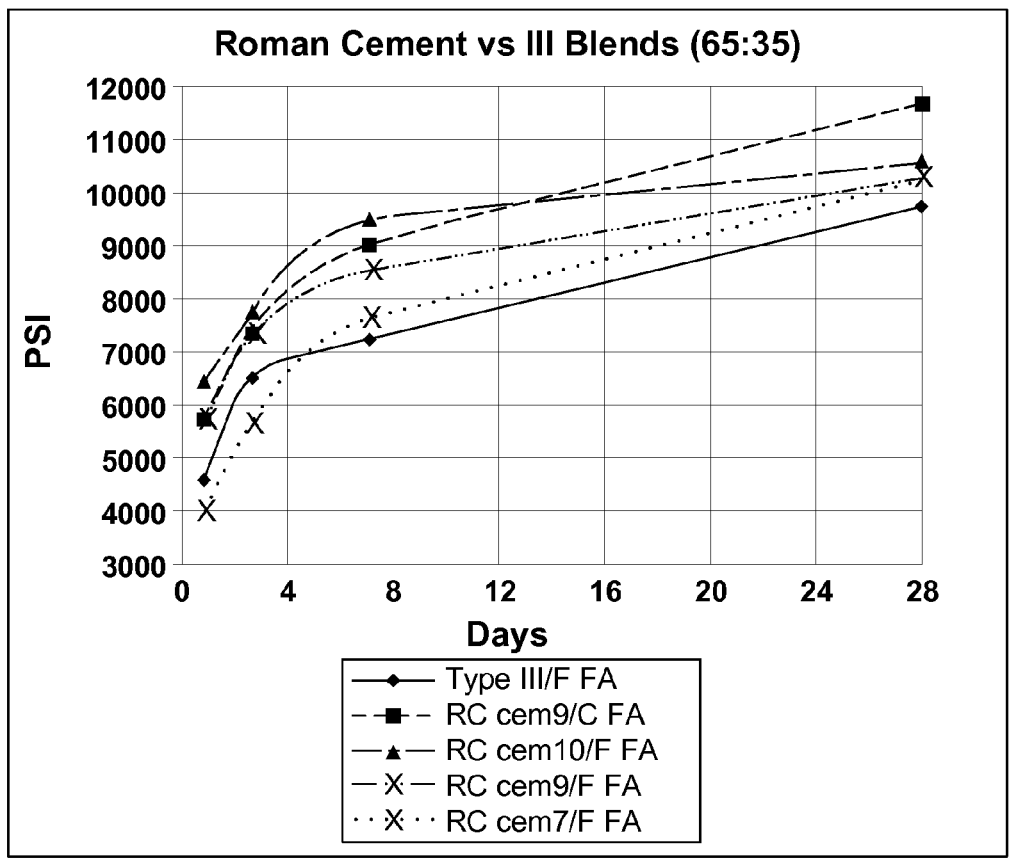
FIG. 7G is a graph comparing the compressive strengths of 65:35 cement-fly ash blends that include narrow PSD Portland cements and a 65:35 cement-fly ash blend that includes a Type III Portland cement.

FIG. 7G is a graph comparing the 1-28 day strength of various 65:35 cement-fly ash blends that include narrow PSD cements (Examples 3, 8, 10 and 19) and a 65:35 cement-fly ash blend that includes a Type III Portland cement (Example 20). All four 65:35 cement-fly ash blends made using the narrow PSD cements had greater strengths at 7 and 28 days, and 3 out of four had greater strengths at 1, 3, 7 and 28 days, compared to the 65:35 cement-fly ash blend made using Type III Portland cement.

As was predicted, water demand increased with increasing fineness of the overall cement-pozzolan blend, which was mainly a function of the concentration and fineness of the cement fraction but was also reduced somewhat by increasing the d10 of the fly ash fraction. The amount of HRWR required for a mixture correlates with water demand. Higher early strength as well as higher later strength generally correlated well with a lower d90 of the cement fraction. There was some correlation between higher later strength and a decrease in the d10 of the fly ash fraction.

The foregoing data support the hypothesis that narrowing the PSD of the hydraulic cement fraction by lowering the d90 without correspondingly decreasing the d10 should increase the early and later strengths of cement-pozzolan blends compared to site blends of similar fly ash replacement levels while maintaining water demand at a commercially and technologically feasible level. Carefully controlling the initial grinding and subsequent classification and regrinding processes to further raise the d10 of the narrow PSD hydraulic cement is predicted to further reduce water demand while maintaining desired early and later strengths as a result of the relatively low d90 and/or d90/10 compared to conventional Portland cements. It is hypothesized that relatively high strength development and low water demand in Portland cement-SCM blends can provided by maximizing the percentage of fine Portland cement particles (e.g., between about 2-25 µm, or 3-15 µm) while minimizing the percentage of ultrafine particles (e.g., below about 1-3 µm) and coarse particles (e.g., greater than about 15-20 µm) and replacing the coarse and optionally the ultrafine Portland cement particles with SCM. Ultrafine Portland cement particles appear to increase water demand without providing a corresponding increase in strength development in cement-SCM blends. If an ultrafine fraction is desired to complete particle grading, it will advantageously comprise one or more SCMs as described herein.

Moreover, minimizing or reducing the quantity of ultrafine Portland cement particles by raising the d10 has the additional benefit of permitting use of a higher quantity of ultrafine SCM particles, which can beneficially fill in pore spaces, provide increased pozzolanic reactivity, and increase short- and long-term strengths. Blending a narrow PSD hydraulic cement having a relatively low d90 (e.g., between about 5-20 µm) and a relatively high d10 (e.g., between about 1-3 µm) with one or more SCMs that provide substantial quantities of coarse particles (e.g., above about 15 µm), some quantity of fine particles (e.g., about 2-15 µm), and also ultrafine particles (e.g., below about 2 µm) can effectively provide or approximate a ternary blend in which SCM dominates the ultrafine fraction, Portland cement dominates the fine fraction, and SCM dominates the coarse fraction.

Different types of SCMs can be used in binary, ternary and quaternary blends proposed herein. For example, a more reactive SCM such as GGBFS or higher reactive class C fly ash can provide the coarse pozzolan fraction and a slower reacting SCM such as class F fly ash, slower reacting class C fly ash, or natural pozzolan can provide the ultrafine fraction. Grinding slower reacting SCMs more finely increases their reactivity, thereby offsetting their lower reactive nature. Providing faster reacting SCMs as coarser particles slows their reaction to moderate the increased reactivity of the narrow PSD hydraulic cement, decreases water demand because of decreased fineness, and increases long-term strength of the cement-pozzolan blend. Nevertheless, it is within the scope of the disclosure to include faster reacting and/or non-reactive SCMs in the ultrafine fraction and slower reactive and/or non-reactive SCMs in the coarse fraction.

Cement-SCM blends made using narrow PSD hydraulic cements and blended with SCM without intergrinding had superior normalized relative strengths relative to its corresponding control, particularly at 28 days, as compared to a commercially available interground cement-fly ash material (INTERCEM) compared to its corresponding control, as published by Lehigh, and an estimated 100% cement control (which was estimated by adding 10% to the published 1-28 day strengths of the 90:10 control). This is a surprising and unexpected result. Intergrinding Portland cement and SCM is standard practice and can provide uniformity in fineness using a circuit grinding process. However, because Portland cement and SCMs are typically of different hardness, they can grind at different rates to yield blends in which the PSDs of the Portland cement and SCM fractions are not equivalent. Fly ash is softer and is typically ground more finely than Portland cement when the two are interground. Differences in hardness and grinding rates can yield unintended and/or changing PSDs of the different interground fractions from batch to batch, producing unpredictable results.

Figure 7H:
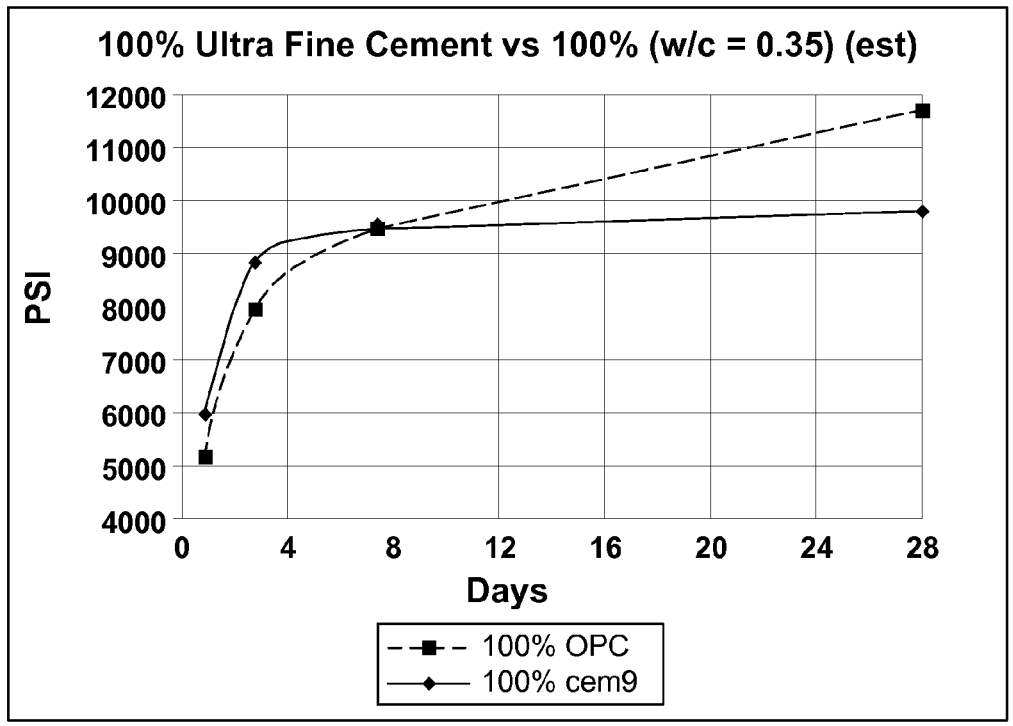
FIG. 7H is an illustrative graph comparing the compressive strength curve of Ordinary Portland Cement (OPC) with a hypothetical strength curve of a narrow PSD cement.

FIG. 7H is an illustrative graph comparing the compressive strength curve of OPC with an estimated hypothetical strength curve of 100% of narrow PSD cement by itself in the absence of SCM replacement. As illustrate, the 100% narrow PSD cement of this hypothetical example has greater 1- and 3-day strengths and smaller 7- and 28-day strengths compared to 100% OPC. This graph illustrates that some narrow PSD cements may perform more like OPC if blended with SCM.

Examples 21-65

Examples 21-65 provide examples of narrow PSD cements within the scope of the disclosure. For these examples, a clinker suitable for making Type I/II Portland cement is coarsely ground to yield an initial ground cement, which is classified to yield a classified fine fraction having a d10 and d90 and a coarse fraction. The coarse fraction is reground (and optionally classified) to yield a reground fraction having a d10 and/or d90 similar to and/or which complement those of the classified fine fraction so that, when the classified fine fraction and reground fraction are combined, the resulting cement product has a d10, d50 and d90 and ratios d90/d10, d50/d10 and d90/d50 as in Examples 21-65 set forth in Table 1. All particle sizes are in (µm) unless otherwise specified.

It is predicted that the hydraulic cement compositions of Examples 21-65 can be blended with one or more SCMs at a given replacement level to yield a cement-SCM blend having higher early strengths compared to blends of Type I/II Portland cement and the same SCM and at the same replacement level. Decreasing the ratio of d90/10 while maintaining a given d90 reduces water demand. Decreasing the ratios d90/d10 and d50/d10 while maintaining a given d10 increases strength. The effect of changing the ratio d90/d50 is largely dependent on the other variables given above.

TABLE 3

| Example | d10 | d50 | d90 | d90/d10 | d50/d10 | D90/d50 |
|---|---|---|---|---|---|---|
| 21 | 2.000 | 15.00 | 30.0 | 15.0 | 7.50 | 2.00 |
| 22 | 3.000 | 15.00 | 27.5 | 9.17 | 5.00 | 1.83 |
| 23 | 4.000 | 15.00 | 25.0 | 6.25 | 3.75 | 1.67 |
| 24 | 5.000 | 15.00 | 22.5 | 4.50 | 3.00 | 1.50 |
| 25 | 6.000 | 15.00 | 20.0 | 3.33 | 2.50 | 1.33 |
| 26 | 1.333 | 9.998 | 30.0 | 22.5 | 7.50 | 3.00 |
| 27 | 1.250 | 8.563 | 25.0 | 20.0 | 6.85 | 2.92 |
| 28 | 1.143 | 7.316 | 20.0 | 17.5 | 6.40 | 2.74 |
| 29 | 3.000 | 6.000 | 17.0 | 5.67 | 2.00 | 2.83 |
| 30 | 2.500 | 7.500 | 16.0 | 6.40 | 3.00 | 2.13 |
| 31 | 2.000 | 6.000 | 15.0 | 7.50 | 3.00 | 2.50 |
| 32 | 1.154 | 5.655 | 15.0 | 13.0 | 4.90 | 2.65 |
| 33 | 0.857 | 4.971 | 15.0 | 17.5 | 5.80 | 3.02 |
| 34 | 1.750 | 5.250 | 14.5 | 8.29 | 3.00 | 2.76 |
| 35 | 1.500 | 5.000 | 14.0 | 9.33 | 3.33 | 2.80 |
| 36 | 1.300 | 4.550 | 13.5 | 10.4 | 3.50 | 2.98 |
| 37 | 1.150 | 4.600 | 13.0 | 11.3 | 4.00 | 2.83 |
| 38 | 0.781 | 4.764 | 12.5 | 16.0 | 6.10 | 2.62 |
| 39 | 0.862 | 4.167 | 12.5 | 14.5 | 4.83 | 3.00 |
| 40 | 0.962 | 4.000 | 12.5 | 13.0 | 4.16 | 3.13 |
| 41 | 1.043 | 4.150 | 12.0 | 11.5 | 3.98 | 2.89 |
| 42 | 1.000 | 4.175 | 11.5 | 11.5 | 4.175 | 2.75 |
| 43 | 1.100 | 4.050 | 11.0 | 10.0 | 3.68 | 2.72 |
| 44 | 0.750 | 3.220 | 10.75 | 14.3 | 4.29 | 3.34 |
| 45 | 0.827 | 3.410 | 10.75 | 13.0 | 4.12 | 3.15 |
| 46 | 0.792 | 3.750 | 10.5 | 13.25 | 4.73 | 2.80 |
| 47 | 0.788 | 3.500 | 10.25 | 13.0 | 4.44 | 2.93 |
| 48 | 1.000 | 3.333 | 10.0 | 10.0 | 3.33 | 3.00 |
| 49 | 0.869 | 3.350 | 10.0 | 11.5 | 3.86 | 2.99 |
| 50 | 0.769 | 3.285 | 10.0 | 13.0 | 4.27 | 3.06 |
| 51 | 0.847 | 3.300 | 9.75 | 11.5 | 3.90 | 2.95 |
| 52 | 1.188 | 3.450 | 9.50 | 8.00 | 2.90 | 2.75 |
| 53 | 1.028 | 3.421 | 9.25 | 9.00 | 3.33 | 2.70 |
| 54 | 0.875 | 3.360 | 8.75 | 10.0 | 3.84 | 2.60 |
| 55 | 0.850 | 3.000 | 8.50 | 10.0 | 3.53 | 2.83 |
| 56 | 0.750 | 3.000 | 8.25 | 11.0 | 4.00 | 2.75 |
| 57 | 0.800 | 2.950 | 8.00 | 10.0 | 3.69 | 2.71 |
| 58 | 0.969 | 3.100 | 7.75 | 8.00 | 3.20 | 2.50 |
| 59 | 0.833 | 2.885 | 7.50 | 9 | 3.46 | 2.60 |
| 60 | 0.685 | 2.736 | 7.25 | 10.6 | 3.99 | 2.65 |

TABLE 3-continued

| Example | d10 | d50 | d90 | d90/d10 | d50/d10 | D90/d50 |
|---|---|---|---|---|---|---|
| 61 | 0.650 | 2.672 | 7.00 | 10.77 | 4.11 | 2.62 |
| 62 | 0.750 | 2.586 | 6.75 | 9 | 3.45 | 2.61 |
| 63 | 0.813 | 2.590 | 6.50 | 8 | 3.19 | 2.51 |
| 64 | 0.694 | 2.480 | 6.25 | 9 | 3.57 | 2.52 |
| 65 | 0.750 | 2.400 | 6.00 | 8 | 3.20 | 2.50 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cement-SCM composition, comprising:
a narrow PSD hydraulic cement fraction comprising:
   a plurality of hydraulic cement particles comprising one or more minerals that, when mixed with water, react to form a cementitious binder comprised of at least one of calcium silicate hydrates or calcium aluminum hydrates,
   the hydraulic cement particles in the narrow PSD hydraulic cement fraction having a particle size distribution (PSD) defined by a lower endpoint d10, an average particle size, and an upper endpoint d90,
   wherein the upper endpoint d90 of the PSD of the hydraulic cement particles is in a range of 11 μm to 30 μm and the lower endpoint d10 of the PSD of the hydraulic cement particles is equal to or greater than 2 μm,
   wherein the d90 and d10 are selected so that the PSD of the hydraulic cement particles has a ratio d90/d10 of less than or equal to 14.5; and
one more types of supplementary cementitious material (SCM) particles selected from the group consisting of pozzolans, fly ash, slag, ground granulated blast-furnace slag, natural pozzolans, artificial pozzolans, limestone, ground limestone, ground quartz, ground filler materials, and pulverized fuel ash, the one or more types of SCM particles comprising:
   a coarse SCM fraction comprising coarse SCM particles having an average particle size greater than the average particle size of the hydraulic cement particles so that greater than 50% of particles larger than 20 μm provided by the coarse SCM fraction and hydraulic cement fraction comprise the coarse SCM particles and the average particle size of the coarse SCM fraction is in a range of about 1.25 times to about 25 times the average particle size of the hydraulic cement fraction, and
   an ultrafine SCM fraction comprising SCM particles having a particle size so that at least 50% of particles smaller than 3 μm provided by the ultrafine SCM fraction and the hydraulic cement fraction comprise the ultrafine SCM particles.

2. A cement-SCM composition as in claim 1, wherein the ratio d90/d10 of the hydraulic cement particles in the hydraulic cement fraction is less than or equal to 13.

3. A cement-SCM composition as in claim 1, wherein the ratio d90/d10 of the hydraulic cement particles in the hydraulic cement fraction is less than or equal to 11.5.

4. A cement-SCM composition as in claim 1, wherein the ratio d90/d10 of the hydraulic cement particles in the hydraulic cement fraction is less than or equal to 9.

5. A cement-SCM composition as in claim 4, wherein the ratio d90/d10 of the hydraulic cement particles in the hydraulic cement fraction is less than or equal to 7.

6. A cement-SCM composition as in claim 1, wherein the hydraulic cement particles in the hydraulic cement fraction consist essentially of Portland cement and/or hydraulic cement having a tricalcium silicate content of at least about 50% by weight.

7. A cement-SCM composition as in claim 6, wherein the upper endpoint d90 is in a range of 12.5 μm to 30 μm, the lower endpoint d10 is equal to or greater than 3 μm, and the range d90/d10 is less than or equal to 10.

8. A cementitious composition formed according to the following method:
   obtaining or forming the cement-SCM composition as in claim 1, wherein the cement-SCM composition is either a preblended composition comprising the narrow PSD hydraulic cement fraction preblended with the coarse and ultrafine SCM fractions so as to form the cement-SCM composition prior to mixing the cement-SCM composition with water and aggregate or the cement-SCM composition is formed in situ within a freshly mixed cementitious composition; and
   forming a fresh cementitious mixture comprising mixture products of the narrow PSD hydraulic cement fraction, the coarse and ultrafine SCM fractions, water, and aggregate.

9. A method of manufacturing the cement-SCM composition of claim 1, comprising:
   obtaining cement clinker comprising one or more cement minerals that, when mixed with water, react to form a cementitious binder;
   initially comminuting the cement clinker to form an initially ground cement material;
   separating the initially ground cement material into a coarse cement fraction and a first fine cement fraction;
   further comminuting the coarse cement fraction to form a second fine cement fraction;
   blending the first and second fine cement fractions together to form the narrow PSD hydraulic cement fraction of the cement-SCM composition; and
   combining the narrow PSD hydraulic cement fraction with the coarse and ultrafine SCM fractions to form the cement-SCM composition.

10. A method as in claim 9, wherein at least one of the steps of initially comminuting or further comminuting is performed in a roll press, and wherein the steps of initially comminuting, separating, further comminuting, and blending are performed in a continuous grinding-classification circuit that continuously grinds, classifies, and regrinds.

11. A method of manufacturing a cementitious composition, comprising:
   obtaining or forming the cement-SCM composition as in claim 1, wherein the cement-SCM composition is either a preblended composition comprising the narrow PSD hydraulic cement fraction preblended with the coarse and ultrafine SCM fractions so as to form the cement-SCM composition prior to mixing the cement-SCM composition with water and aggregate or the cement-SCM composition is formed in situ within a freshly mixed cementitious composition; and forming a fresh cementitious mixture comprising mixture products of the narrow PSD hydraulic cement fraction, the coarse and ultrafine SCM fractions, water, and aggregate.

12. A method as in claim 11, further comprising:
placing the fresh cementitious mixture into a desired configuration; and
allowing the fresh cementitious mixture to harden into a hardened cementitious composition.

13. A cement-SCM blend, comprising:
a narrow PSD hydraulic cement fraction comprised of:
  a plurality of hydraulic cement particles comprising one or more minerals that, when mixed with water, react to form a cementitious binder comprised of at least one of calcium silicate hydrates or calcium aluminum hydrates,
  the hydraulic cement particles in the hydraulic cement composition having a particle size distribution (PSD) defined by a lower endpoint d10, an average particle size, a median particle size d50, and an upper endpoint d90,
  wherein the upper endpoint d90 of the PSD of the hydraulic cement particles is greater than 10 μm,
  wherein the median particle size d50 is equal to or greater than 6.5 μm,
  wherein the lower endpoint d10 of the PSD of the hydraulic cement particles is equal to or greater than 3 μm,
  wherein the PSD of the hydraulic cement particles has a ratio d90/d10 of less than or equal to 10, and
  wherein the d50/d10 is less than or equal to 6.85;
a first supplementary cementitious material (SCM) fraction that provides coarse SCM particles having an average particle size greater than the average particle size of the hydraulic cement particles so that greater than 50% of particles larger than 20 μm provided by the first SCM fraction and the hydraulic cement fraction comprise the coarse SCM particles, the first SCM fraction being selected from the group consisting of natural pozzolans, artificial pozzolans, pulverized fuel ash, fly ash, slag, ground granulated blast-furnace slag, ground filler materials, and mixtures thereof; and
a second supplementary cementitious material (SCM) fraction that provides ultrafine SCM particles having a particle size so that at least 50% of particles smaller than 3 μm provided by the second SCM fraction and the hydraulic cement fraction comprise the ultrafine SCM particles.

14. A method of manufacturing the cement-SCM blend of claim 13, comprising:
forming the hydraulic cement fraction by:
  obtaining cement clinker comprising one or more cement minerals that, when mixed with water, react to form a cementitious binder comprised of at least one of calcium silicate hydrates or calcium aluminum hydrates;
  initially comminuting the cement clinker to form an initially ground cement material;
  separating the initially ground cement material into a coarse cement fraction and a first fine cement fraction;
  further comminuting the coarse cement fraction to form a second fine cement fraction; and
  blending the first and second fine cement fractions together to form the narrow PSD hydraulic cement fraction,
  wherein at least one of the steps of initially comminuting or further comminuting is performed in a roll press, and wherein the steps of initially comminuting, separating, further comminuting, and blending are performed in a continuous grinding-classification circuit that continuously grinds, classifies, and regrinds; and
blending the narrow PSD hydraulic cement fraction with the first and second SCM fractions to form the cement-SCM blend.

15. A method as in claim 14, wherein the cement-SCM blend is formed prior to use in preparing a fresh cementitious composition comprising the cement-SCM blend, water, and aggregate.

16. A method as in claim 14, wherein the cement-SCM blend is formed in situ during preparation of a fresh cementitious composition comprising the narrow PSD hydraulic cement fraction, the first and second SCM fractions, water, and aggregate.

17. A cement-SCM blend, comprising:
a narrow PSD hydraulic cement fraction comprised of:
  a plurality of hydraulic cement particles comprising one or more minerals that, when mixed with water, react to form a cementitious binder comprised of at least one of calcium silicate hydrates or calcium aluminum hydrates,
  the hydraulic cement particles in the hydraulic cement composition having a particle size distribution (PSD) defined by a d10, d50, d90, average particle size, and a ratio d90/d10 of less than or equal to 20,
  wherein the d10 is greater than or equal to 1.75 μm, the d50 is greater than or equal to 6.5 μm, and the d90 is greater than 10 μm;
  wherein the hydraulic cement particles are formed by obtaining a cement clinker and then grinding and classifying the cement clinker to within the PSD defined by the d10, d50, d90 and ratio d90/d10;
a first supplementary cementitious material (SCM) fraction that provides coarse SCM particles having an average particle size that is about 1.25 times to about 25 times greater than the an average particle size of the hydraulic cement particles of the hydraulic cement fraction so that greater than 50% of particles larger than 20 μm provided by the first SCM fraction and the hydraulic cement fraction comprise the coarse SCM particles, wherein the first SCM fraction comprises at least one member selected from the group consisting of natural pozzolans, artificial pozzolans, pulverized fuel ash, fly ash, slag, ground granulated blast-furnace slag, inert filler materials, and mixtures thereof; and
a second supplementary cementitious material (SCM) fraction that provides ultrafine SCM particles having a particle size so that at least 50% of particles smaller than 3 μm provided by the second SCM fraction and the hydraulic cement fraction comprise the ultrafine SCM particles.

18. A cement-SCM blend as in claim 17, wherein the narrow PSD hydraulic cement fraction is formed by a process comprising the steps of:
initially comminuting the cement clinker to form an initially ground cement material;
separating the initially ground cement material into a coarse cement fraction and a first fine cement fraction;
further comminuting the coarse cement fraction to form a second fine cement fraction; and
blending the first and second fine cement fractions together to form the narrow PSD hydraulic cement fraction,
wherein the steps of initially comminuting or further comminuting are performed by a roll press, and wherein the steps of initially comminuting, separating, further comminuting, and blending are performed in a continuous grinding-classification circuit that continuously grinds, classifies, and regrinds.

19. A cement-SCM blend as in claim 18, wherein the narrow PSD hydraulic cement fraction comprises Portland cement.

20. A cement-SCM blend as in claim 19, wherein the ultrafine SCM particles comprises an inert filler material that provides nucleation sites that promote formation of hydration products during hydration of the cement-SCM blend and a reactive SCM that reacts with excess calcium liberated from the hydraulic cement fraction during hydration of the cement-SCM blend, and wherein the coarse SCM particles comprises at least one of a non-reactive SCM or a reactive SCM.

* * * * *